(12) United States Patent
Gan

(10) Patent No.: US 12,256,093 B2
(45) Date of Patent: Mar. 18, 2025

(54) METHOD, APPARATUS AND SYSTEM FOR ENCODING AND DECODING A BLOCK OF VIDEO SAMPLES

(71) Applicant: CANON KABUSHIKI KAISHA, Tokyo (JP)

(72) Inventor: Jonathan Gan, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 17/910,287

(22) PCT Filed: Nov. 23, 2020

(86) PCT No.: PCT/AU2020/051270
§ 371 (c)(1),
(2) Date: Sep. 8, 2022

(87) PCT Pub. No.: WO2021/179034
PCT Pub. Date: Sep. 16, 2021

(65) Prior Publication Data
US 2023/0140041 A1    May 4, 2023

(30) Foreign Application Priority Data

Mar. 10, 2020 (AU) ................................ 2020201753

(51) Int. Cl.
*H04N 19/18* (2014.01)
*H04N 19/176* (2014.01)
*H04N 19/184* (2014.01)
*H04N 19/46* (2014.01)
*H04N 19/467* (2014.01)

(52) U.S. Cl.
CPC ......... *H04N 19/467* (2014.11); *H04N 19/176* (2014.11); *H04N 19/18* (2014.11); *H04N 19/184* (2014.11)

(58) Field of Classification Search
CPC .............................. H04N 19/46; H04N 19/18
(Continued)

(56) References Cited

U.S. PATENT DOCUMENTS

2013/0188725 A1    7/2013  Wang
2013/0272424 A1*  10/2013  Sole Rojals ........... H04N 19/61
                                                    375/240.18
(Continued)

FOREIGN PATENT DOCUMENTS

CN         104380740 A       2/2015
CN         105850125 A       8/2016
(Continued)

OTHER PUBLICATIONS

Wen Gao, et al., AHG13: Suggested Bug Fix for Lossless Coding in HM6.1 and HEVC text specification (Ticket 410), Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Doc. No. JCTVC-I0464-v3, XP30053084.
(Continued)

*Primary Examiner* — Jeffery A Williams
(74) *Attorney, Agent, or Firm* — Canon U.S.A., Inc. IP Division

(57) ABSTRACT

A system and method of decoding a sub-block of residual coefficients of a transform block from a video bitstream. The method comprises determining whether sign bit hiding is used for the sub-block, the determination based on a value of a transform skip flag determined for the sub-block and a value of a sign bit hiding flag associated with the sub-block; if sign bit hiding is not used, decoding a number of sign bits equal to a number of significant coefficients in the subblock; and decoding the sub-block by reconstructing the residual coefficients of the sub-block using the decoded sign bits.

14 Claims, 15 Drawing Sheets

(58) Field of Classification Search
USPC .................................................... 375/240.26
See application file for complete search history.

(56) References Cited

U.S. PATENT DOCUMENTS

| | | | |
|---|---|---|---|
| 2013/0294524 | A1 | 11/2013 | Van Der Auwera |
| 2015/0181237 | A1 | 6/2015 | Tsukuba et al. |
| 2017/0310999 | A1 | 10/2017 | Hebel |
| 2021/0266598 | A1* | 8/2021 | Hashimoto .......... H04N 19/157 |
| 2022/0224942 | A1 | 7/2022 | Hashimoto |
| 2023/0007267 | A1 | 1/2023 | Yoo |

FOREIGN PATENT DOCUMENTS

| | | |
|---|---|---|
| CN | 105959697 A | 9/2016 |
| CN | 108900839 A | 11/2018 |
| EP | 3869808 A1 | 8/2021 |
| EP | 4114006 A1 | 1/2023 |
| JP | 2021136460 A | 9/2021 |
| JP | 2023516617 A | 4/2023 |
| WO | 2014/160714 A1 | 10/2014 |
| WO | 2021/172912 A1 | 9/2021 |

OTHER PUBLICATIONS

Jungah Choi, et al., CE3-2.7: Luma and chroma BDPCM and IBC with TSRC for lossless coding, Joint Video Experts Team (JVET) of ITU-T SG 16 WP 3 and ISO/IEC JTC 1/SC 29/WG 11, 17th Meeting: Brussels, BE, Jan. 7-17, 2020, Doc. No. JVET-Q0082, XP30222526.

Jonatan Samuelsson, et al., On TSRC, DQ and SDH signalling, Joint Video Experts Team (JVET) of ITU-T SG 16 WP 3 and ISO/IEC JTC 1/SC 29/WG 11, 18th Meeting: by teleconference, Apr. 15-24, 2020, Doc. JVET-R0486-v6, XP30287864.

Benjamin Bross, et al., Versatile Video Coding (Draft 7), Joint Video Experts Team (JVET) of ITU-T SG 16 WP 3 and ISO/IEC JTC 1/SC 29/WG 11, 16th Meeting: Geneva, CH, Oct. 1-11, 2019, Doc. No. JVET-P2001-vE, XP30224330.

Alican Nalci, et al., AHG9: High-level constraints on dependent quantization and sigh data hiding, Joint Video Experts Team (JVET) of ITU-T SG 16 WP 3 and ISO/IEC JTC 1/SC 29/WG 11, 18th Meeting: by teleconference, Apr. 15-24, 2020, Doc. No. JVET-R0271-v3, XP3028633.

Flynn, D et al., High Efficiency Video Coding (HEVC) Range Extensions text specification: Draft 3, Joint Collaborative Team on Video Coding (JCT-VC) of ITU-T SG 16 WP 3 and ISO/IEC JTC 1/SC 29/WG 11, 13th Meeting, Incheon, KR, Apr. 18-26, 2013, Doc. No. JCTVC-M1005_v1.

859 closed defect (fixed), JVET-Q0089—TS residual coding disabled with dependent quantization, https://jvet.hhi.fraunhofer.de/trac/vvc/ticket/859.

Jiang Bo et al., Research on the Information Hiding Technologies for Video Encoded with HEVC, Master's Thesis; Hunan Institute of Science and Technology, May 2015, English abstract is on sixth page.

* cited by examiner

METHOD, APPARATUS AND SYSTEM FOR ENCODING AND DECODING A BLOCK OF VIDEO SAMPLES

REFERENCE TO RELATED APPLICATION(S)

This application is the National Phase application of PCT Application No. PCT/AU2020/051270 filed on Nov. 23, 2020. This application claims the benefit under 35 U.S.C. § 119 of the filing date of Australian Patent Application No. 2020201753, filed Mar. 10, 2020. Each of the above-cited patent applications is hereby incorporated by reference in its entirety as if fully set forth herein.

TECHNICAL FIELD

The present invention relates generally to digital video signal processing and, in particular, to a method, apparatus and system for encoding and decoding a block of video samples. The present invention also relates to a computer program product including a computer readable medium having recorded thereon a computer program for encoding and decoding a block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Video Experts Team" (JVET). The Joint Video Experts Team (JVET) includes members of Study Group 16, Question 6 (SG16/Q6) of the Telecommunication Standardisation Sector (ITU-T) of the International Telecommunication Union (ITU), also known as the "Video Coding Experts Group" (VCEG), and members of the International Organisations for Standardisation/ International Electrotechnical Commission Joint Technical Committee 1/Subcommittee 29/Working Group 11 (ISO/ IEC JTC1/SC29/WG11), also known as the "Moving Picture Experts Group" (MPEG).

The Joint Video Experts Team (JVET) issued a Call for Proposals (CfP), with responses analysed at its 10th meeting in San Diego, USA. The submitted responses demonstrated video compression capability significantly outperforming that of the current state-of-the-art video compression standard, i.e.: "high efficiency video coding" (HEVC). On the basis of this outperformance it was decided to commence a project to develop a new video compression standard, to be named 'versatile video coding' (VVC). VVC is anticipated to address ongoing demand for ever-higher compression performance, especially as video formats increase in capability (e.g., with higher resolution and higher frame rate) and address increasing market demand for service delivery over WANs, where bandwidth costs are relatively high. At the same time, VVC must be implementable in contemporary silicon processes and offer an acceptable trade-off between the achieved performance versus the implementation cost (for example, in terms of silicon area, CPU processor load, memory utilisation and bandwidth).

Video data includes a sequence of frames of image data, each of which include one or more colour channels. Generally, one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, this colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Moreover, the Cb and Cr channels may be sampled spatially at a lower rate (subsampled) compared to the luma channel, for example half horizontally and half vertically—known as a '4:2:0 chroma format'. The 4:2:0 chroma format is commonly used in 'consumer' applications, such as internet video streaming, broadcast television, and storage on Blu-Ray™ disks. Subsampling the Cb and Cr channels at half-rate horizontally and not subsampling vertically is known as a '4:2:2 chroma format'. The 4:2:2 chroma format is typically used in professional applications, including capture of footage for cinematic production and the like. The higher sampling rate of the 4:2:2 chroma format makes the resulting video more resilient to editing operations such as colour grading. Prior to distribution to consumers, 4:2:2 chroma format material is often converted to the 4:2:0 chroma format and then encoded for distribution to consumers. In addition to chroma format, video is also characterised by resolution and frame rate. Example resolutions are ultra-high definition (UHD) with a resolution of 3840×2160 or '8K' with a resolution of 7680×4320 and example frame rates are 60 or 120 Hz. Luma sample rates may range from approximately 500 mega samples per second to several giga samples per second. For the 4:2:0 chroma format, the sample rate of each chroma channel is one quarter the luma sample rate and for the 4:2:2 chroma format, the sample rate of each chroma channel is one half the luma sample rate.

The VVC standard is a 'block based' codec, in which frames are firstly divided into a square array of regions known as 'coding tree units' (CTUs). CTUs generally occupy a relatively large area, such as 128×128 luma samples. However, CTUs at the right and bottom edge of each frame may be smaller in area. Associated with each CTU is a 'coding tree' for the luma channel and an additional coding tree for the chroma channels. A coding tree defines a decomposition of the area of the CTU into a set of blocks, also referred to as 'coding blocks' (CBs). It is also possible for a single coding tree to specify blocks both for the luma channel and the chroma channels, in which case the collections of collocated coding blocks are referred to as 'coding units' (CUs), i.e., each CU having a coding block for each colour channel. The CBs are processed for encoding or decoding in a particular order. As a consequence of the use of the 4:2:0 chroma format, a CTU with a luma coding tree for a 128×128 luma sample area has a corresponding chroma coding tree for a 64×64 chroma sample area, collocated with the 128×128 luma sample area. When a single coding tree is in use for the luma channel and the chroma channels, the collections of collocated blocks for a given area are generally referred to as 'units', for example the above-mentioned CUs, as well as 'prediction units' (PUs), and 'transform units' (TUs). When separate coding trees are used for a given area, the above-mentioned CBs, as well as 'prediction blocks' (PBs), and 'transform blocks' (TBs) are used.

Notwithstanding the above distinction between 'units' and 'blocks', the term 'block' may be used as a general term for areas or regions of a frame for which operations are applied to all colour channels.

For each CU a prediction unit (PU) of the contents (sample values) of the corresponding area of frame data is generated (a 'prediction unit'). If the PU is generated from sample values in a previously signalled frame, the prediction is called inter prediction. If the PU is generated from previous samples in the same frame, the prediction is called intra prediction. Further, a representation of the difference (or 'residual' in the spatial domain) between the prediction and the contents of the area as seen at input to the encoder is formed. The difference in each colour channel may be transformed and coded as a block of residual coefficients, forming one or more TUs for a given CU. The residual coefficients may be transformed by a transform such as a Discrete Cosine Transform (DCT), a Discrete Sine Transform (DST), or other transform, to produce a final block of transform coefficients that substantially decorrelates the residual samples. Substantial coding gain may be achieved by quantising the transform coefficients. The quantised transform coefficients are then traversed in an order such as a backward diagonal scan, and each coefficient is encoded by an entropy encoder. Entropy coding consists of expressing each coefficient in terms of syntax elements, each of which is binarised. The binarised syntax elements may then be further encoded by a context adaptive binary arithmetic coder (CABAC), or passed on to the bitstream ("bypass coding").

In some classes of video content such as screen content, it may be advantageous to avoid performing a transform. If a transform is to be avoided, the residual coefficients are quantised, traversed, and encoded. Because the statistics for the residual coefficients are not the same as the statistics for the transform coefficients, it is generally advantageous for the residual coefficients to be encoded using a different process to the encoding process for transform coefficients. Typical methods used for encoding residual coefficients include a "regular residual coding" (RRC) process and a "transform skip residual coding" (TSRC) process, with a particular one of the processes chosen for a block depending on whether a transform was performed.

In some use cases it may be desired to compress the video data losslessly (that is, without coding loss). A CU may be encoded losslessly by skipping both the transform and quantisation steps. In the TSRC process, quantisation may be avoided by setting a "quantisation parameter" to a value that signals no quantisation. However, as indicated above the TSRC process may only be suitable for classes of video content such as screen content. Therefore, forcing lossless encoding of video data to use the TSRC process may be suboptimal. It is desirable for lossless encoding to have more flexible options available according to the statistics of the video data being encoded, while minimising the amount of additional logic required to support additional flexibility.

SUMMARY

It is an object of the present invention to substantially overcome, or at least ameliorate, one or more disadvantages of existing arrangements.

One aspect of the present invention provides a method of decoding a sub-block of residual coefficients of a transform block from a video bitstream, the method comprising: determining whether sign bit hiding is used for the sub-block, the determination based on a value of a transform skip flag determined for the sub-block and a value of a sign bit hiding flag associated with the sub-block; if sign bit hiding is not used, decoding a number of sign bits equal to a number of significant coefficients in the subblock; and decoding the sub-block by reconstructing the residual coefficients of the sub-block using the decoded sign bits.

According to another aspect, sign bit hiding is used if the sign bit hiding flag has a value of TRUE, the transform skip flag has a value of FALSE and a difference between a first significant position and a last significant position of the sub-block is greater than three.

According to another aspect, sign bit hiding is not used if the sign bit hiding flag has a value of TRUE and the transform skip flag has a value of TRUE.

According to another aspect, the method further comprises, if sign bit hiding is determined to be used, decoding a number of sign bits equal to the number of significant coefficients in the sub-block minus one, and determining an additional sign bit from a sum of parities of the significant coefficients of the sub-block.

Another aspect of the present invention provides a method of decoding a sub-block of residual coefficients of a transform block from a video bitstream, the method comprising: determining whether sign bit hiding is used for the sub-block, the determination based on a value of a sign bit hiding flag and a value of quantisation parameter associated with the sub-block; if sign bit hiding is not used, decoding a number of sign bits equal to a number of significant coefficients in the subblock; and decoding the sub-block by reconstructing the residual coefficients of the sub-block using the decoded sign bits.

According to another aspect, sign bit hiding is not used if the sign bit hiding flag has a value of TRUE and the quantisation parameter is equal to 4.

According to another aspect, sign bit hiding is used if the sign bit hiding flag has a value of TRUE, the quantisation parameter is not equal to 4 and a difference between a first significant position and a last significant position of the sub-block is greater than three.

Another aspect of the present invention provides a method of decoding a sub-block of residual coefficients of a transform block from a video bitstream, the method comprising: determining whether sign bit hiding is used for the sub-block, the determination based on a value of a sign bit hiding flag and a value of a TSRC disabled flag; if sign bit hiding is not used, decoding a number of sign bits equal to a number of significant coefficients in the subblock; and decoding the sub-block by reconstructing the residual coefficients of the sub-block using the decoded sign bits.

According to another aspect, sign bit hiding is used if the sign bit hiding flag has a value of TRUE, the TSRC disabled flag has a value of FALSE and a difference between a first significant position and a last significant position of the sub-block is greater than three.

According to another aspect, sign bit hiding flag has a value of TRUE and the TSRC disabled flag has a value of TRUE.

Another aspect of the present invention provides a non-transitory computer readable medium having a computer program stored thereon to implement a method of decoding a sub-block of residual coefficients of a transform block from a video bitstream, the method comprising: determining whether sign bit hiding is used for the sub-block, the determination based on a value of a transform skip flag determined for the sub-block and a value of a sign bit hiding flag associated with the sub-block; if sign bit hiding is not used, decoding a number of sign bits equal to a number of significant coefficients in the subblock; and decoding the sub-block by reconstructing the residual coefficients of the sub-block using the decoded sign bits.

Another aspect of the present invention provides a system, comprising: a memory; and a processor, wherein the processor is configured to execute code stored on the memory for implementing a method of decoding a sub-block of residual coefficients of a transform block from a video bitstream, the method comprising: determining whether sign bit hiding is used for the sub-block, the determination based on a value of a transform skip flag determined for the sub-block and a value of a sign bit hiding flag associated with the sub-block; if sign bit hiding is not used, decoding a number of sign bits equal to a number of significant coefficients in the subblock; and decoding the sub-block by reconstructing the residual coefficients of the sub-block using the decoded sign bits.

Another aspect of the present invention provides a video decoder, configured to: receive a sub-block of residual coefficients of a transform block from a video bitstream, determine whether sign bit hiding is used for the sub-block, the determination based on a value of a transform skip flag determined for the sub-block and a value of a sign bit hiding flag associated with the sub-block; if sign bit hiding is not used, decode a number of sign bits equal to a number of significant coefficients in the subblock; and decode the sub-block by reconstructing the residual coefficients of the sub-block using the decoded sign bits.

Other aspects are also described.

BRIEF DESCRIPTION OF THE DRAWINGS

At least one embodiment of the present invention will now be described with reference to the following drawings and appendices, in which.

DETAILED DESCRIPTION INCLUDING BEST MODE

Figure 1:
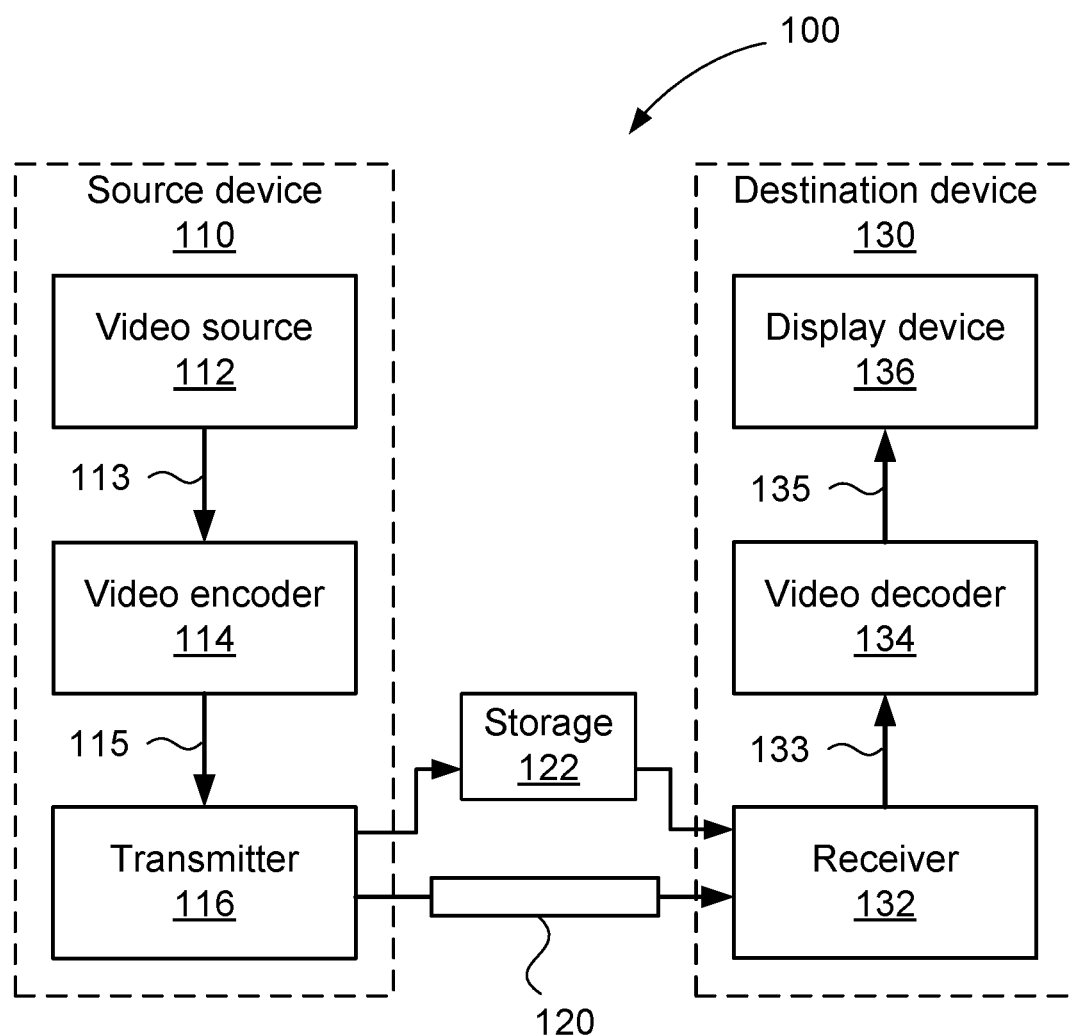
FIG. 1 is a schematic block diagram showing a video encoding and decoding system.

Where reference is made in any one or more of the accompanying drawings to steps and/or features, which have the same reference numerals, those steps and/or features have for the purposes of this description the same function(s) or operation(s), unless the contrary intention appears.

As described above, it may be desirable for lossless encoding to be supported with the existing building blocks of the codec. However, exclusively using the TSRC process for lossless encoding may produce suboptimal coding performance, as diverse classes of video data coded in a lossless manner cannot be guaranteed to exhibit the statistical properties which the TSRC process is designed for. Then, greater flexibility in the choice of high-level building blocks that lossless coding can use allows superior coding performance with minimal additional complexity to the overall design.

FIG. 1 is a schematic block diagram showing functional modules of a video encoding and decoding system 100. The system 100 includes a source device 110 and a destination device 130. A communication channel 120 is used to communicate encoded video information from the source device 110 to the destination device 130. In some arrangements, the source device 110 and destination device 130 may either or both comprise respective mobile telephone handsets or "smartphones", in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over-the-air television broadcasts, cable television applications, internet video applications (including streaming) and applications where encoded video data is captured on some computer-readable storage medium, such as hard disk drives in a file server.

As shown in FIG. 1, the source device 110 includes a video source 112, a video encoder 114 and a transmitter 116. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example displaying the video output of an operating system and various applications executing upon a computing device, for example a tablet computer. Examples of source devices 110 that may include an image capture sensor as the video source 112 include smart-phones, video camcorders, professional video cameras, and network video cameras.

Figure 3:
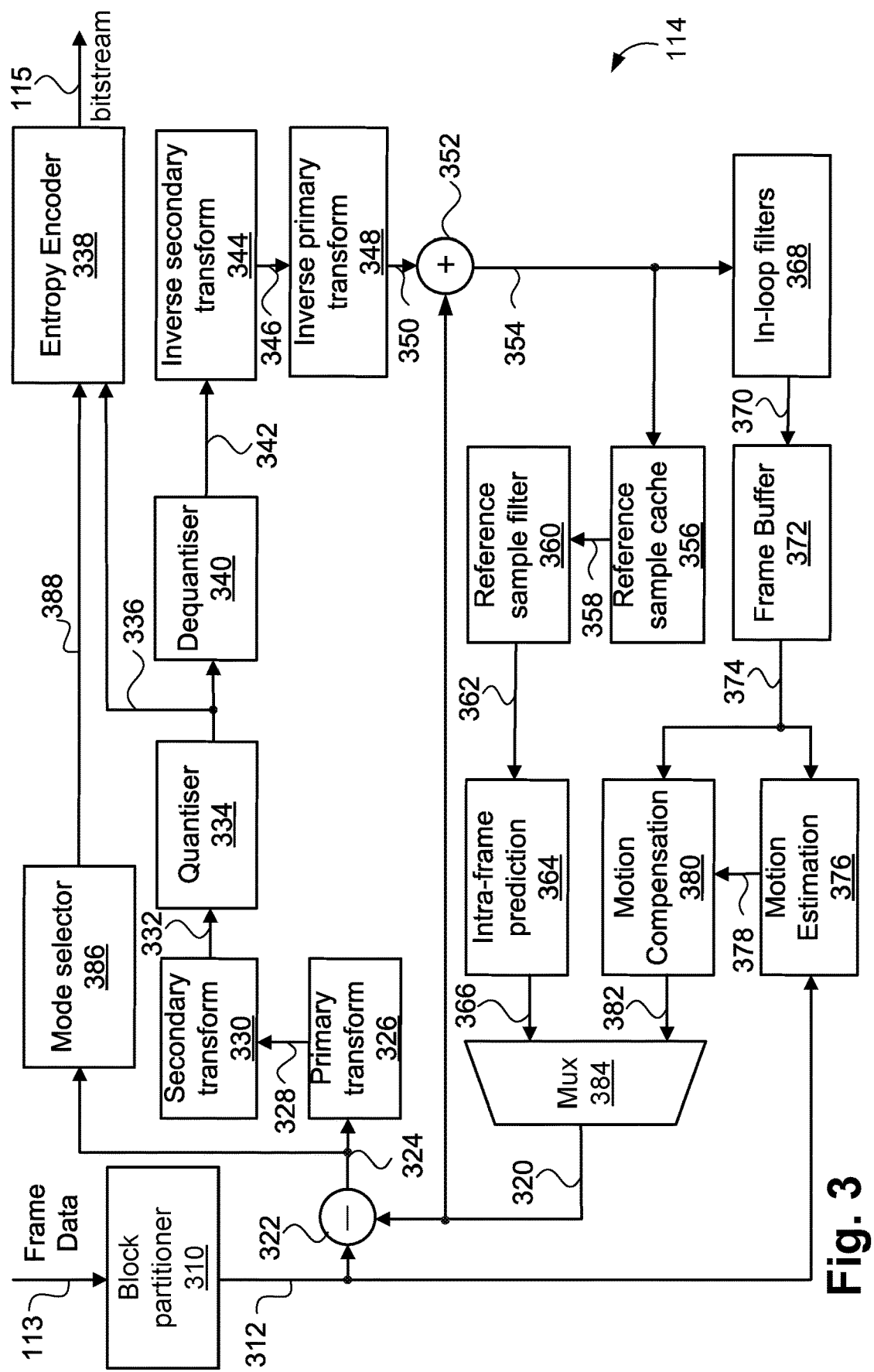
FIG. 3 is a schematic block diagram showing functional modules of a video encoder.

The video encoder 114 converts (or 'encodes') the captured frame data (indicated by an arrow 113) from the video source 112 into a bitstream (indicated by an arrow 115) as described further with reference to FIG. 3. The bitstream 115 is transmitted by the transmitter 116 over the communication channel 120 as encoded video data (or "encoded video information"). It is also possible for the bitstream 115 to be stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and passes received video data to the video decoder 134 as a bitstream (indicated by an arrow 133). The video decoder 134 then outputs decoded frame data (indicated by an arrow 135) to the display device 136 to reproduce the video data. The decoded frame data 135 has the same chroma format as the frame data 113. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers.

Figure 2A:
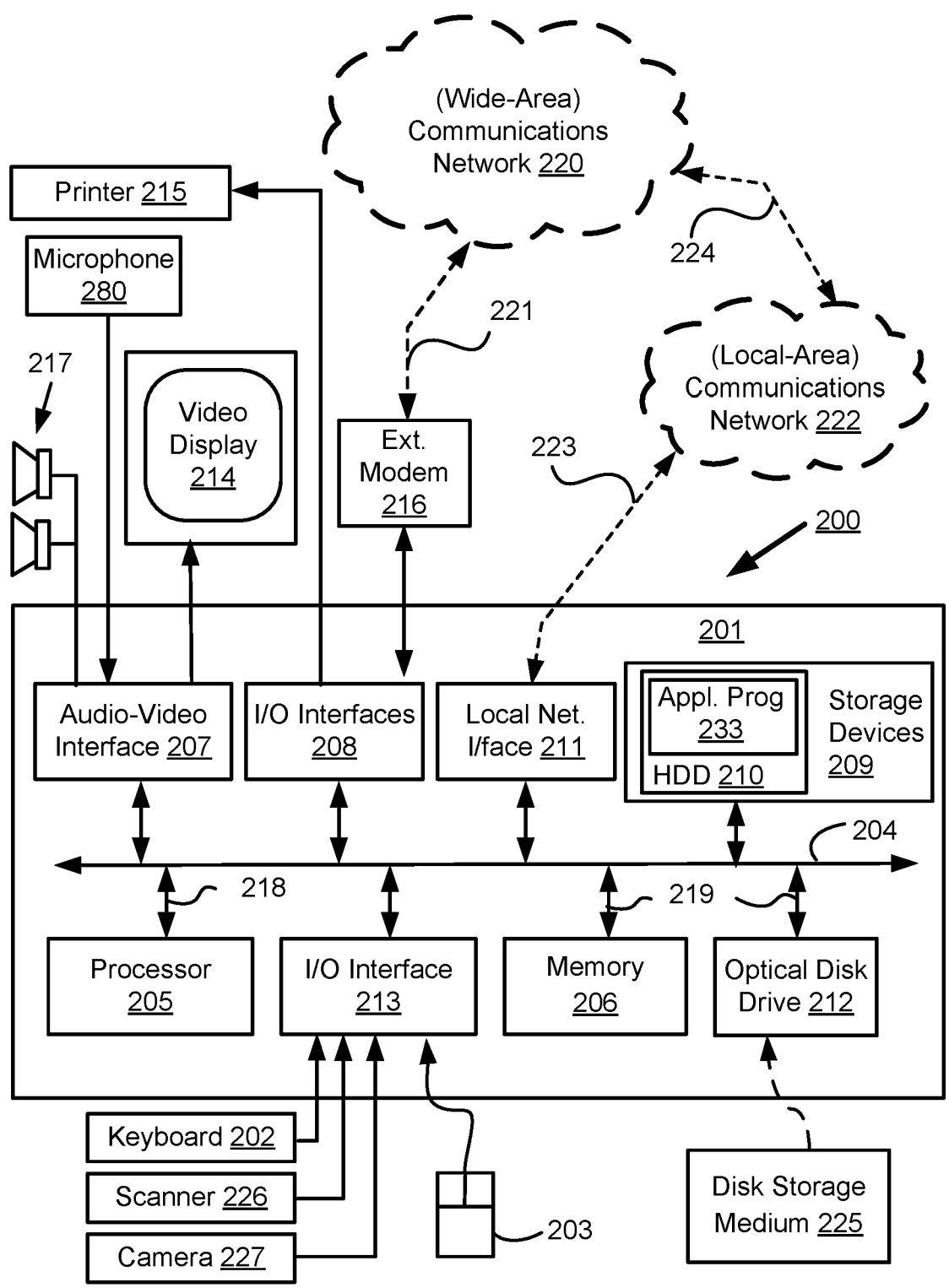
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200. In particular, the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
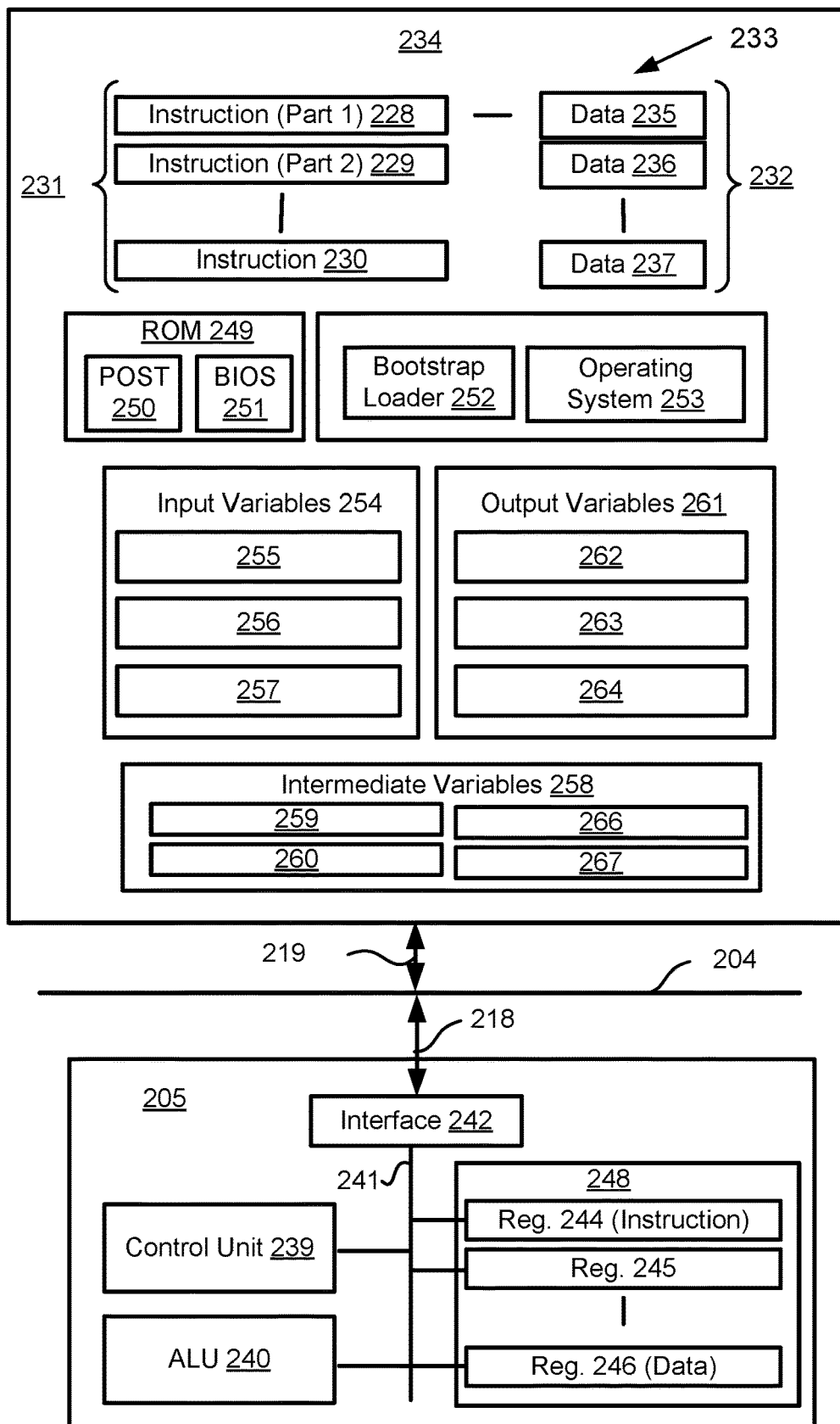

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the method of FIGS. 9 to 14, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 4:
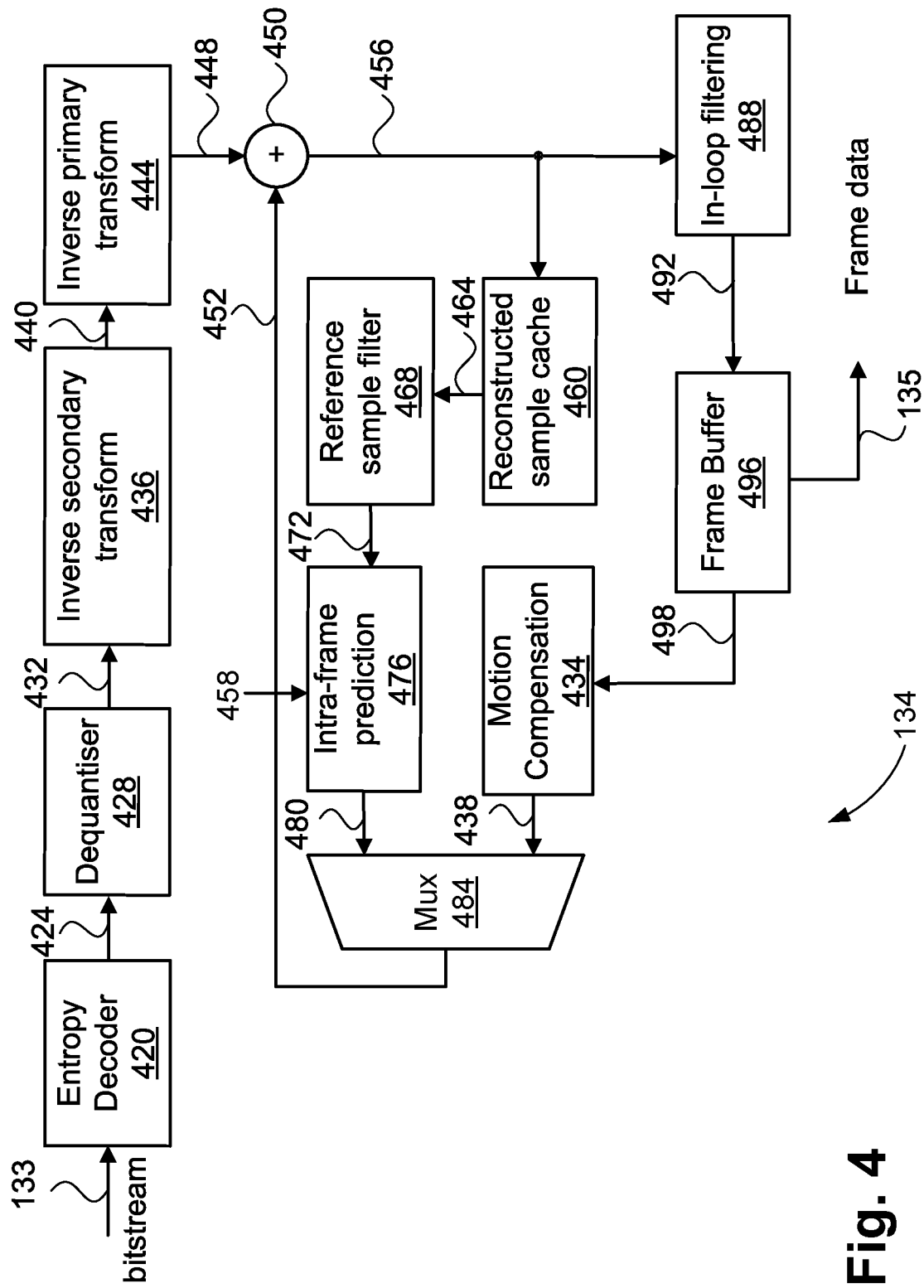
FIG. 4 is a schematic block diagram showing functional modules of a video decoder.

FIG. 3 shows a schematic block diagram showing functional modules of the video encoder 114. FIG. 4 shows a schematic block diagram showing functional modules of the video decoder 134. Generally, data passes between functional modules within the video encoder 114 and the video decoder 134 in groups of samples or coefficients, such as divisions of blocks into sub-blocks of a fixed size, or as arrays. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively, the video encoder 114 and video decoder 134 may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 114 comprises modules 310-386 and the video decoder 134 comprises modules 420-496 which may each be implemented as one or more software code modules of the software application program 233.

Although the video encoder 114 of FIG. 3 is an example of a versatile video coding (VVC) video encoding pipeline, other video codecs may also be used to perform the processing stages described herein. The video encoder 114 receives captured frame data 113, such as a series of frames, each frame including one or more colour channels. The frame data 113 may be in any chroma format, for example 4:0:0, 4:2:0, 4:2:2, or 4:4:4 chroma format. A block partitioner 310 firstly divides the frame data 113 into CTUs, generally square in shape and configured such that a particular size for the CTUs is used. The size of the CTUs may be 64×64, 128×128, or 256×256 luma samples for example. The block partitioner 310 further divides each CTU into one or more CBs according to a luma coding tree and a chroma coding tree. The CBs have a variety of sizes, and may include both square and non-square aspect ratios. In the VVC standard, CBs, CUs, PUs, and TUs always have side lengths that are powers of two. Thus, a current CB, represented as 312, is output from the block partitioner 310, progressing in accordance with an iteration over the one or more blocks of the CTU, in accordance with the luma coding tree and the chroma coding tree of the CTU. Options for partitioning CTUs into CBs are further described below with reference to FIGS. 5 and 6.

The CTUs resulting from the first division of the frame data 113 may be scanned in raster scan order and may be grouped into one or more 'slices'. A slice may be an 'intra' (or 'I') slice. An intra slice (I slice) indicates that every CU in the slice is intra predicted. Alternatively, a slice may be uni- or bi-predicted ('P' or 'B' slice, respectively), indicating additional availability of uni- and bi-prediction in the slice, respectively.

For each CTU, the video encoder 114 operates in two stages. In the first stage (referred to as a 'search' stage), the block partitioner 310 tests various potential configurations of a coding tree. Each potential configuration of a coding tree has associated 'candidate' CBs. The first stage involves testing various candidate CBs to select CBs providing high compression efficiency with low distortion. The testing generally involves a Lagrangian optimisation whereby a candidate CB is evaluated based on a weighted combination of the rate (coding cost) and the distortion (error with respect to the input frame data 113). The 'best' candidate CBs (the CBs with the lowest evaluated rate/distortion) are selected for subsequent encoding into the bitstream 115. Included in evaluation of candidate CBs is an option to use a CB for a given area or to further split the area according to various splitting options and code each of the smaller resulting areas with further CBs, or split the areas even further. As a consequence, both the CBs and the coding tree themselves are selected in the search stage.

The video encoder 114 produces a prediction block (PB), indicated by an arrow 320, for each CB, for example the CB 312. The PB 320 is a prediction of the contents of the associated CB 312. A subtracter module 322 produces a difference, indicated as 324 (or 'residual', referring to the difference being in the spatial domain), between the PB 320 and the CB 312. The residual 324 is a block-size difference between corresponding samples in the PB 320 and the CB 312. The residual 324 is transformed, quantised and represented as a transform block (TB), indicated by an arrow 336. The PB 320 and associated TB 336 are typically chosen from one of many possible candidate CBs, for example based on evaluated cost or distortion.

A candidate coding block (CB) is a CB resulting from one of the prediction modes available to the video encoder 114 for the associated PB and the resulting residual. Each candidate CB results in one or more corresponding TBs. The TB 336 is a quantised and transformed representation of the residual 324. When combined with the predicted PB in the video decoder 114, the TB 336 reduces the difference between decoded CBs and the original CB 312 at the expense of additional signalling in a bitstream.

Each candidate coding block (CB), that is prediction block (PB) in combination with a transform block (TB), thus has an associated coding cost (or 'rate') and an associated difference (or 'distortion'). The rate is typically measured in bits. The distortion of the CB is typically estimated as a difference in sample values, such as a sum of absolute differences (SAD) or a sum of squared differences (SSD). The estimate resulting from each candidate PB may be determined by a mode selector 386 using the residual 324 to determine a prediction mode (represented by an arrow 388). Estimation of the coding costs associated with each candidate prediction mode and corresponding residual coding can be performed at significantly lower cost than entropy coding of the residual. Accordingly, a number of candidate modes can be evaluated to determine an optimum mode in a rate-distortion sense.

Determining an optimum mode in terms of rate-distortion is typically achieved using a variation of Lagrangian optimisation. Selection of the prediction mode 388 typically involves determining a coding cost for the residual data resulting from application of a particular prediction mode. The coding cost may be approximated by using a 'sum of absolute transformed differences' (SATD) whereby a relatively simple transform, such as a Hadamard transform, is used to obtain an estimated transformed residual cost. In some implementations using relatively simple transforms, the costs resulting from the simplified estimation method are monotonically related to the actual costs that would otherwise be determined from a full evaluation. In implementations with monotonically related estimated costs, the simplified estimation method may be used to make the same decision (i.e. prediction mode) with a reduction in complexity in the video encoder 114. To allow for possible non-monotonicity in the relationship between estimated and actual costs, the simplified estimation method may be used to generate a list of best candidates. The non-monotonicity may result from further mode decisions available for the coding of residual data, for example. The list of best candidates may be of an arbitrary number. A more complete search may be performed using the best candidates to establish optimal mode choices for coding the residual data for each of the candidates, allowing a final selection of the prediction mode 388 along with other mode decisions.

Prediction modes fall broadly into two categories. A first category is 'intra-frame prediction' (also referred to as 'intra prediction'). In intra-frame prediction, a prediction for a block is generated, and the generation method may use other samples obtained from the current frame. Types of intra prediction include intra planar, intra DC, intra angular, and matrix weighted intra prediction (MIP). For an intra-predicted PB, it is possible for different intra-prediction modes to be used for luma and chroma, and thus intra prediction is described primarily in terms of operation upon PBs. Additionally, chroma CBs may be predicted from co-located luma samples by a cross-component linear model prediction.

The second category of prediction modes is 'inter-frame prediction' (also referred to as 'inter prediction'). In inter-frame prediction a prediction for a block is produced using samples from one or two frames preceding the current frame in an order of coding frames in the bitstream. Moreover, for inter-frame prediction, a single coding tree is typically used for both the luma channel and the chroma channels. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted. Frames are typically coded using a 'group of pictures' structure, enabling a temporal hierarchy of frames. A temporal hierarchy of frames allows a frame to reference a preceding and a subsequent picture in the order of displaying the frames. The images are coded in the order necessary to ensure the dependencies for decoding each frame are met.

A subcategory of inter prediction is referred to as 'skip mode'. Inter prediction and skip modes are described as two distinct modes. However, both inter prediction mode and skip mode involve motion vectors referencing blocks of samples from preceding frames. Inter prediction involves a coded motion vector delta, specifying a motion vector relative to a motion vector predictor. The motion vector predictor is obtained from a list of one or more candidate motion vectors, selected with a 'merge index'. The coded motion vector delta provides a spatial offset to a selected motion vector prediction. Inter prediction also uses a coded residual in the bitstream 133. Skip mode uses only an index (also named a 'merge index') to select one out of several motion vector candidates. The selected candidate is used without any further signalling. Also, skip mode does not support coding of any residual coefficients. The absence of coded residual coefficients when the skip mode is used means that there is no need to perform transforms for the skip mode. Therefore, skip mode does not typically result in pipeline processing issues. Pipeline processing issues may be the case for intra predicted CUs and inter predicted CUs. Due to the limited signalling of the skip mode, skip mode is useful for achieving very high compression performance when relatively high quality reference frames are available. Bi-predicted CUs in higher temporal layers of a random-access group-of-picture structure typically have high quality reference pictures and motion vector candidates that accurately reflect underlying motion.

The samples are selected according to a motion vector and reference picture index. The motion vector and reference picture index applies to all colour channels and thus inter prediction is described primarily in terms of operation upon PUs rather than PBs. Within each category (that is, intra- and inter-frame prediction), different techniques may be applied to generate the PU. For example, intra prediction may use values from adjacent rows and columns of previously reconstructed samples, in combination with a direction to generate a PU according to a prescribed filtering and generation process. Alternatively, the PU may be described using a small number of parameters. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a predetermined motion refinement process may be applied to generate dense motion estimates based on referenced sample blocks.

Lagrangian or similar optimisation processing can be employed to both select an optimal partitioning of a CTU into CBs (by the block partitioner 310) as well as the selection of a best prediction mode from a plurality of possibilities. Through application of a Lagrangian optimisation process of the candidate modes in the mode selector module 386, the prediction mode with the lowest cost measurement is selected as the 'best' mode. The lowest cost mode is the selected prediction mode 388 and is also encoded in the bitstream 115 by an entropy encoder 338. The selection of the prediction mode 388 by operation of the mode selector module 386 extends to operation of the block partitioner 310. For example, candidates for selection of the prediction mode 388 may include modes applicable to a given block and additionally modes applicable to multiple smaller blocks that collectively are collocated with the given block. In cases including modes applicable to a given block and smaller collocated blocks, the process of selection of candidates implicitly is also a process of determining the best hierarchical decomposition of the CTU into CBs.

In the second stage of operation of the video encoder 114 (referred to as a 'coding' stage), an iteration over the selected luma coding tree and the selected chroma coding tree, and hence each selected CB, is performed in the video encoder 114. In the iteration, the CBs are encoded into the bitstream 115, as described further herein.

The entropy encoder 338 supports both variable-length coding of syntax elements and arithmetic coding of syntax elements. Arithmetic coding is supported using a context-adaptive binary arithmetic coding (CABAC) process. Arithmetically coded syntax elements consist of sequences of one or more 'bins'. Bins, like bits, have a value of '0' or '1'. Bins are not encoded in the bitstream 115 as discrete bits. Bins have an associated predicted (or 'likely' or 'most probable') value and an associated probability, known as a 'context'. When the actual bin to be coded matches the predicted value, a 'most probable symbol' (MPS) is coded. Coding a most probable symbol is relatively inexpensive in terms of consumed bits. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (that is, a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context can be dependent on earlier bins in the syntax element, the bin values of neighbouring syntax elements (i.e. those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the video encoder 114 are bins that lack a context ('bypass bins'). Bypass bins are coded assuming an equiprobable distribution between a '0' and a '1'. Thus, each bin occupies one bit in the bitstream 115. The absence of a context saves memory and reduces complexity, and thus bypass bins are used where the distribution of values for the particular bin is not skewed.

The entropy encoder 338 encodes the prediction mode 388 using a combination of context-coded and bypass-coded bins. For example, when the prediction mode 388 is an intra prediction mode, a list of 'most probable modes' is generated in the video encoder 114. The list of most probable modes is typically of a fixed length, such as three or six modes, and may include modes encountered in earlier blocks. A context-coded bin encodes a flag indicating if the prediction mode is one of the most probable modes. If the intra prediction mode 388 is one of the most probable modes, further signalling, using bypass-coded bins, is encoded. The encoded further signalling is indicative of which most probable mode corresponds with the intra prediction mode 388, for example using a truncated unary bin string. Otherwise, the intra prediction mode 388 is encoded as a 'remaining mode'. Encoding as a remaining mode uses an alternative syntax, such as a fixed-length code, also coded using bypass-coded bins, to express intra prediction modes other than those present in the most probable mode list.

A multiplexer module 384 outputs the PB 320 according to the determined best prediction mode 388, selecting from the tested prediction mode of each candidate CB. The candidate prediction modes need not include every conceivable prediction mode supported by the video encoder 114.

Having determined and selected the PB 320, and subtracted the PB 320 from the original sample block at the subtractor 322, a residual with lowest coding cost, represented as 324, is obtained and subjected to lossy compression. The lossy compression process comprises the steps of transformation, quantisation and entropy coding. A forward primary transform module 326 applies a forward transform to the residual 324, converting the residual 324 from the spatial domain to the frequency domain, and producing primary transform coefficients represented by an arrow 328. The primary transform coefficients 328 are passed to a forward secondary transform module 330 to produce transform coefficients represented by an arrow 332 by performing a non-separable secondary transform (NSST) operation. The forward primary transform is typically separable, transforming a set of rows and then a set of columns of each block, typically using a type-II discrete cosine transform (DCT-2), although a type-VII discrete sine transform (DST-7) and a type-VIII discrete cosine transform (DCT-8) may also be available, for example horizontally for block widths not exceeding 16 samples and vertically for block heights not exceeding 16 samples. The transformation of each set of rows and columns is performed by applying one-dimensional transforms firstly to each row of a block to produce an intermediate result and then to each column of the intermediate result to produce a final result. The forward secondary transform is generally a non-separable transform, which is only applied for the residual of intra-predicted CUs and may nonetheless also be bypassed. The forward secondary transform operates either on 16 samples (arranged as the upper-left 4×4 sub-block of the primary transform coefficients 328) or 64 samples (arranged as the upper-left 8×8 coefficients, arranged as four 4×4 sub-blocks of the primary transform coefficients 328). Moreover, the matrix coefficients of the forward secondary transform are selected from multiple sets according to the intra prediction mode of the CU such that two sets of coefficients are available for use. The use of one of the sets of matrix coefficients, or the bypassing of the forward secondary transform, is signalled with an "nsst_index" syntax element, coded using a truncated unary binarisation to express the values zero (secondary transform not applied), one (first set of matrix coefficients selected), or two (second set of matrix coefficients selected).

The video encoder 114 may also choose to skip both the primary and secondary transforms, known as 'transform skip' mode. Skipping the transforms is suited to residual data that lacks adequate correlation for reduced coding cost via expression as transform basis functions. Certain types of content, such as relatively simple computer generated graphics may exhibit similar behaviour. When transform skip mode is used, the transform coefficients 332 are the same as the residual coefficients 324.

The transform coefficients 332 are passed to a quantiser module 334. At the module 334, quantisation in accordance with a 'quantisation parameter' is performed to produce quantised coefficients, represented by the arrow 336. The quantisation parameter is constant for a given TB and thus results in a uniform scaling for the production of residual coefficients for a TB. A non-uniform scaling is also possible by application of a 'quantisation matrix', whereby the scaling factor applied for each residual coefficient is derived from a combination of the quantisation parameter and the corresponding entry in a scaling matrix, typically having a size equal to that of the TB. The scaling matrix may have a size that is smaller than the size of the TB, and when applied to the TB a nearest neighbour approach is used to provide scaling values for each residual coefficient from a scaling matrix smaller in size than the TB size. The quantised coefficients 336 are supplied to the entropy encoder 338 for encoding in the bitstream 115. Typically, the quantised coefficients of each TB with at least one significant quantised coefficient are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. Additionally, the prediction mode 388 and the corresponding block partitioning are also encoded in the bitstream 115.

As described above, the video encoder 114 needs access to a frame representation corresponding to the frame representation seen by the video decoder 134. Thus, the quantised coefficients 336 are also inverse quantised by a dequantiser module 340 to produce reconstructed transform coefficients, represented by an arrow 342. The reconstructed transform coefficients 342 are passed through an inverse secondary transform module 344 to produce reconstructed primary transform coefficients, represented by an arrow 346. The reconstructed primary transform coefficients 346 are passed to an inverse primary transform module 348 to produce reconstructed residual samples, represented by an arrow 350, of the TU. The types of inverse transform performed by the inverse secondary transform module 344 correspond with the types of forward transform performed by the forward secondary transform module 330. The types of inverse transform performed by the inverse primary transform module 348 correspond with the types of primary transform performed by the primary transform module 326. A summation module 352 adds the reconstructed residual samples 350 and the PU 320 to produce reconstructed samples (indicated by an arrow 354) of the CU.

The reconstructed samples 354 are passed to a reference sample cache 356 and an in-loop filters module 368. The reference sample cache 356, typically implemented using static RAM on an ASIC (thus avoiding costly off-chip memory access) provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 356 supplies reference samples (represented by an arrow 358) to a reference sample filter 360. The sample filter 360 applies a smoothing operation to produce filtered reference samples (indicated by an arrow 362). The filtered reference samples 362 are used by an intra-frame prediction module 364 to produce an intra-predicted block of samples, represented by an arrow 366. For each candidate intra prediction mode the intra-frame prediction module 364 produces a block of samples, that is 366.

The in-loop filters module 368 applies several filtering stages to the reconstructed samples 354. The filtering stages include a 'deblocking filter' (DBF) which applies smoothing aligned to the CU boundaries to reduce artefacts resulting from discontinuities. Another filtering stage present in the in-loop filters module 368 is an 'adaptive loop filter' (ALF), which applies a Wiener-based adaptive filter to further reduce distortion. A further available filtering stage in the in-loop filters module 368 is a 'sample adaptive offset' (SAO) filter. The SAO filter operates by firstly classifying reconstructed samples into one or multiple categories and, according to the allocated category, applying an offset at the sample level.

Filtered samples, represented by an arrow 370, are output from the in-loop filters module 368. The filtered samples 370 are stored in a frame buffer 372. The frame buffer 372 typically has the capacity to store several (for example up to 16) pictures and thus is stored in the memory 206. The frame buffer 372 is not typically stored using on-chip memory due to the large memory consumption required. As such, access to the frame buffer 372 is costly in terms of memory bandwidth. The frame buffer 372 provides reference frames (represented by an arrow 374) to a motion estimation module 376 and a motion compensation module 380.

The motion estimation module 376 estimates a number of 'motion vectors' (indicated as 378), each being a Cartesian spatial offset from the location of the present CB, referencing a block in one of the reference frames in the frame buffer 372. A filtered block of reference samples (represented as 382) is produced for each motion vector. The filtered reference samples 382 form further candidate modes available for potential selection by the mode selector 386. Moreover, for a given CU, the PU 320 may be formed using one reference block ('uni-predicted') or may be formed using two reference blocks ('bi-predicted'). For the selected motion vector, the motion compensation module 380 produces the PB 320 in accordance with a filtering process supportive of sub-pixel accuracy in the motion vectors. As such, the motion estimation module 376 (which operates on many candidate motion vectors) may perform a simplified filtering process compared to that of the motion compensation module 380 (which operates on the selected candidate only) to achieve reduced computational complexity. When the video encoder 114 selects inter prediction for a CU the motion vector 378 is encoded into the bitstream 115.

Although the video encoder 114 of FIG. 3 is described with reference to versatile video coding (VVC), other video coding standards or implementations may also employ the processing stages of modules 310-386. The frame data 113 (and bitstream 115) may also be read from (or written to) memory 206, the hard disk drive 210, a CD-ROM, a Blu-ray Disk™ or other computer readable storage medium. Additionally, the frame data 113 (and bitstream 115) may be received from (or transmitted to) an external source, such as a server connected to the communications network 220 or a radio-frequency receiver.

The video decoder 134 is shown in FIG. 4. Although the video decoder 134 of FIG. 4 is an example of a versatile video coding (VVC) video decoding pipeline, other video codecs may also be used to perform the processing stages described herein. As shown in FIG. 4, the bitstream 133 is input to the video decoder 134. The bitstream 133 may be read from memory 206, the hard disk drive 210, a CD-ROM, a Blu-ray Disk™ or other non-transitory computer readable storage medium. Alternatively, the bitstream 133 may be received from an external source such as a server connected to the communications network 220 or a radio-frequency receiver. The bitstream 133 contains encoded syntax elements representing the captured frame data to be decoded.

The bitstream 133 is input to an entropy decoder module 420. The entropy decoder module 420 extracts syntax elements from the bitstream 133 by decoding sequences of 'bins' and passes the values of the syntax elements to other modules in the video decoder 134. One example of a syntax element extracted from the bitstream 133 are quantised coefficients 424. The entropy decoder module 420 uses an arithmetic decoding engine to decode each syntax element as a sequence of one or more bins. Each bin may use one or more 'contexts', with a context describing probability levels to be used for coding a 'one' and a 'zero' value for the bin. Where multiple contexts are available for a given bin, a 'context modelling' or 'context selection' step is performed to choose one of the available contexts for decoding the bin. The process of decoding bins forms a sequential feedback loop. The number of operations in the feedback loop is preferably minimised to enable the entropy decoder 420 to achieve a high throughput in bins/second. Context modelling depends on other properties of the bitstream known to the video decoder 134 at the time of selecting the context, that is, properties preceding the current bin. For example, a context may be selected based on the quad-tree depth of the current CU in the coding tree. Dependencies are preferably based on properties that are known in advance of decoding a bin, or are determined without requiring long sequential processes.

The quantised coefficients 424 are input to a dequantiser module 428. The dequantiser module 428 performs inverse quantisation (or 'scaling') on the quantised coefficients 424 to create reconstructed intermediate transform coefficients, represented by an arrow 432, according to a quantisation parameter. Should use of a non-uniform inverse quantisation matrix be indicated in the bitstream 133, the video decoder 134 reads a quantisation matrix from the bitstream 133 as a sequence of scaling factors and arranges the scaling factors into a matrix. The inverse scaling uses the quantisation matrix in combination with the quantisation parameter to create the reconstructed intermediate transform coefficients 432. The reconstructed intermediate transform coefficients 432 are passed to an inverse secondary transform module 436 where a secondary transform may be applied, in accordance with a decoded "nsst_index" syntax element. The "nsst_index" is decoded from the bitstream 133 by the entropy decoder 420, under execution of the processor 205. The inverse secondary transform module 436 produces reconstructed transform coefficients 440.

The reconstructed transform coefficients 440 are passed to an inverse primary transform module 444. The module 444 transforms the coefficients from the frequency domain back to the spatial domain. The result of operation of the module 444 is a block of residual samples, represented by an arrow 448. The block of residual samples 448 is equal in size to the corresponding CU. The type of inverse primary transform may be a type-II discrete cosine transform (DCT-2), a type-VII discrete sine transform (DST-7), a type-VIII discrete cosine transform (DCT-8), or a 'transform skip' mode. The use of transform skip mode is signalled by a transform skip flag, which may be decoded from the bitstream 133 or otherwise inferred. When transform skip mode is used, the residual samples 448 are the same as the reconstructed transform coefficients 440.

The residual samples 448 are supplied to a summation module 450. At the summation module 450 the residual samples 448 are added to a decoded PB (represented as 452) to produce a block of reconstructed samples, represented by an arrow 456. The reconstructed samples 456 are supplied to a reconstructed sample cache 460 and an in-loop filtering module 488. The in-loop filtering module 488 produces reconstructed blocks of frame samples, represented as 492. The frame samples 492 are written to a frame buffer 496.

The reconstructed sample cache 460 operates similarly to the reconstructed sample cache 356 of the video encoder 114. The reconstructed sample cache 460 provides storage for reconstructed sample needed to intra predict subsequent CBs without the memory 206 (for example by using the data 232 instead, which is typically on-chip memory). Reference samples, represented by an arrow 464, are obtained from the reconstructed sample cache 460 and supplied to a reference sample filter 468 to produce filtered reference samples indicated by arrow 472. The filtered reference samples 472 are supplied to an intra-frame prediction module 476. The module 476 produces a block of intra-predicted samples, represented by an arrow 480, in accordance with an intra prediction mode parameter 458 signalled in the bitstream 133 and decoded by the entropy decoder 420.

When the prediction mode of a CB is indicated to be intra prediction in the bitstream 133, intra-predicted samples 480 form the decoded PB 452 via a multiplexor module 484. Intra prediction produces a prediction block (PB) of samples, that is, a block in one colour component, derived using 'neighbouring samples' in the same colour component. The neighbouring samples are samples adjacent to the current block and by virtue of being preceding in the block decoding order have already been reconstructed. Where luma and chroma blocks are collocated, the luma and chroma blocks may use different intra prediction modes. However, the two chroma channels each share the same intra prediction mode.

Intra prediction for luma blocks consist of four types. "DC intra prediction" involves populating a PB with a single value representing the average of the neighbouring samples. "Planar intra prediction" involves populating a PB with samples according to a plane, with a DC offset and a vertical and horizontal gradient being derived from the neighbouring samples. "Angular intra prediction" involves populating a PB with neighbouring samples filtered and propagated across the PB in a particular direction (or 'angle'). In VVC a PB may select from up to 65 angles, with rectangular blocks able to utilise different angles not available to square blocks. "Matrix intra prediction" involves populating a PB by multiplying a reduced set of neighbouring samples by one of a number of available matrices available to the video decoder 134. The reduced set of neighbouring samples is produced by filtering and subsampling the neighbouring samples. Then, a reduced set of prediction samples is produced by multiplying the reduced set of samples by a matrix, and adding an offset vector. The matrix and associated offset vector are selected from a number of possible matrices depending on the size of the PB, with a particular selection of matrix and offset vector being indicated by a "MIP mode" syntax element. For example, for PBs with size greater than 8×8 there are 11 MIP modes, while for PBs of size 8×8 there are 19 MIP modes. Finally, the PB produced by matrix intra prediction is populated from the reduced set of prediction samples by interpolation.

A fifth type of intra prediction is available to chroma PBs, whereby the PB is generated from collocated luma reconstructed samples according to a 'cross-component linear model' (CCLM) mode. Three different CCLM modes are available, each of which uses a different model derived from the neighbouring luma and chroma samples. The derived model is then used to generate a block of samples for the chroma PB from the collocated luma samples.

When the prediction mode of a CB is indicated to be inter prediction in the bitstream 133, a motion compensation module 434 produces a block of inter-predicted samples, represented as 438, using a motion vector and reference frame index to select and filter a block of samples 498 from the frame buffer 496. The block of samples 498 is obtained from a previously decoded frame stored in the frame buffer 496. For bi-prediction, two blocks of samples are produced and blended together to produce samples for the decoded PB 452. The frame buffer 496 is populated with filtered block data 492 from an in-loop filtering module 488. As with the in-loop filtering module 368 of the video encoder 114, the in-loop filtering module 488 applies any of the DBF, the ALF and SAO filtering operations. Generally, the motion vector is applied to both the luma and chroma channels, although the filtering processes for sub-sample interpolation luma and chroma channel are different. The frame buffer 496 outputs the decoded video samples 135.

Figure 5:
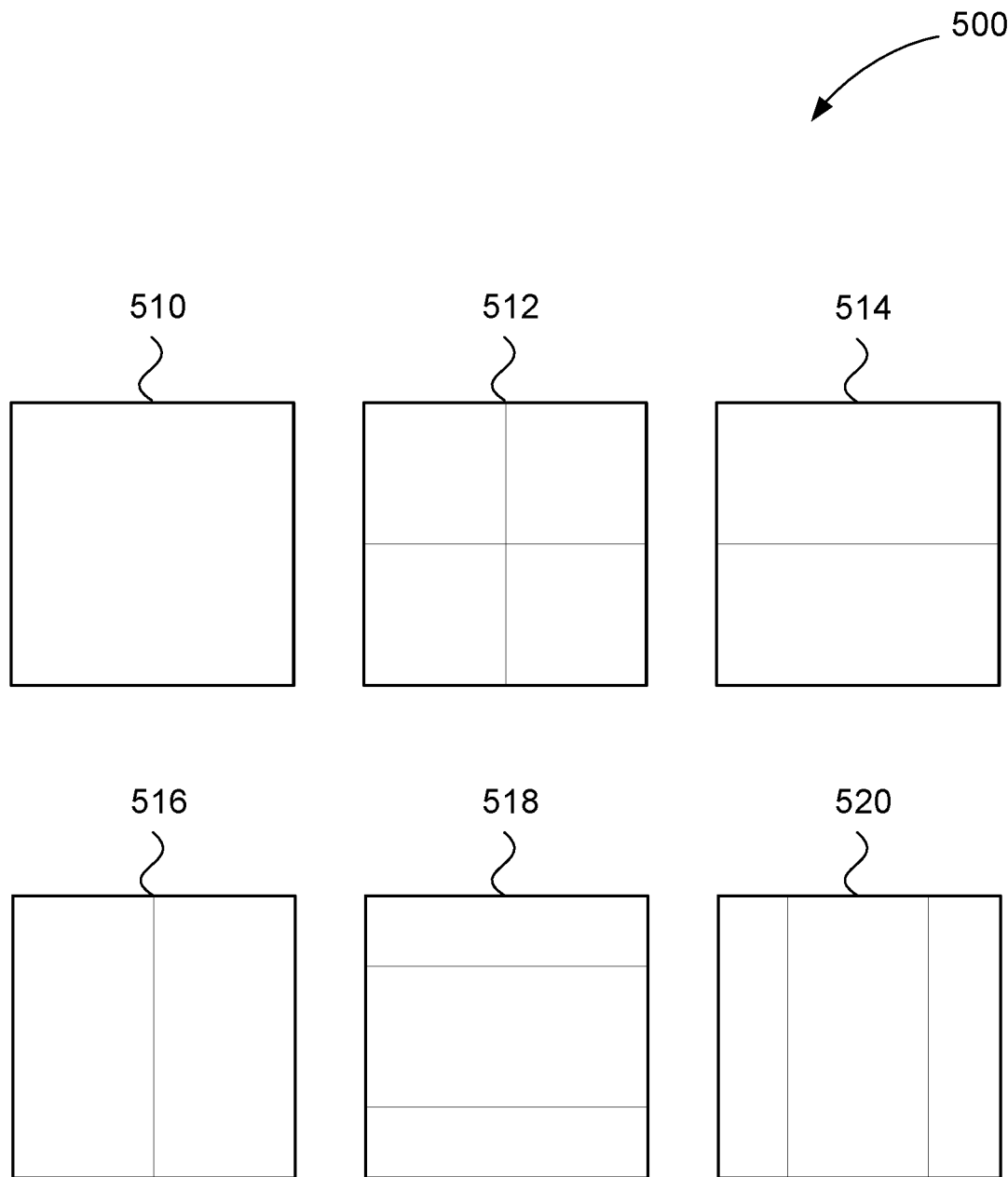
FIG. 5 is a schematic block diagram showing the available divisions of a block into one or more blocks in the tree structure of versatile video coding.

FIG. 5 is a schematic block diagram showing a collection 500 of available divisions or splits of a region into one or more sub-regions in the tree structure of versatile video coding. The divisions shown in the collection 500 are available to the block partitioner 310 of the encoder 114 to divide each CTU into one or more CUs or CBs according to a coding tree, as determined by the Lagrangian optimisation, as described with reference to FIG. 3.

Although the collection 500 shows only square regions being divided into other, possibly non-square sub-regions, it should be understood that the diagram 500 is showing the potential divisions but not requiring the containing region to be square. If the containing region is non-square, the dimensions of the blocks resulting from the division are scaled according to the aspect ratio of the containing block. Once a region is not further split, that is, at a leaf node of the coding tree, a CU occupies that region. The particular subdivision of a CTU into one or more CUs by the block partitioner 310 is referred to as the 'coding tree' of the CTU.

The process of subdividing regions into sub-regions must terminate when the resulting sub-regions reach a minimum CU size. In addition to constraining CUs to prohibit block areas smaller than a predetermined minimum size, for example 16 samples, CUs are constrained to have a minimum width or height of four. Other minimums, both in terms of width and height or in terms of width or height are also possible. The process of subdivision may also terminate prior to the deepest level of decomposition, resulting in a CU larger than the minimum CU size. It is possible for no splitting to occur, resulting in a single CU occupying the entirety of the CTU. A single CU occupying the entirety of the CTU is the largest available coding unit size. Due to use of subsampled chroma formats, such as 4:2:0, arrangements of the video encoder 114 and the video decoder 134 may terminate splitting of regions in the chroma channels earlier than in the luma channels.

At the leaf nodes of the coding tree exist CUs, with no further subdivision. For example, a leaf node 510 contains one CU. At the non-leaf nodes of the coding tree exist a split into two or more further nodes, each of which could be a leaf node that forms one CU, or a non-leaf node containing further splits into smaller regions. At each leaf node of the coding tree, one coding block exists for each colour channel. Splitting terminating at the same depth for both luma and chroma results in three collocated CBs. Splitting terminating at a deeper depth for luma than for chroma results in a plurality of luma CBs being collocated with the CBs of the chroma channels.

A quad-tree split 512 divides the containing region into four equal-size regions as shown in FIG. 5. Compared to HEVC, versatile video coding (VVC) achieves additional flexibility with the addition of a horizontal binary split 514 and a vertical binary split 516. Each of the splits 514 and 516 divides the containing region into two equal-size regions. The division is either along a horizontal boundary (514) or a vertical boundary (516) within the containing block.

Further flexibility is achieved in versatile video coding with addition of a ternary horizontal split 518 and a ternary vertical split 520. The ternary splits 518 and 520 divide the block into three regions, bounded either horizontally (518) or vertically (520) along ¼ and ¾ of the containing region width or height. The combination of the quad tree, binary tree, and ternary tree is referred to as 'QTBTTT'. The root of the tree includes zero or more quadtree splits (the 'QT' section of the tree). Once the QT section terminates, zero or more binary or ternary splits may occur (the 'multi-tree' or 'MT' section of the tree), finally ending in CBs or CUs at leaf nodes of the tree. Where the tree describes all colour channels, the tree leaf nodes are CUs. Where the tree describes the luma channel or the chroma channels, the tree leaf nodes are CBs.

Compared to HEVC, which supports only the quad tree and thus only supports square blocks, the QTBTTT results in many more possible CU sizes, particularly considering possible recursive application of binary tree and/or ternary tree splits. The potential for unusual (non-square) block sizes can be reduced by constraining split options to eliminate splits that would result in a block width or height either being less than four samples or in not being a multiple of four samples. Generally, the constraint would apply in considering luma samples. However, in the arrangements described, the constraint can be applied separately to the blocks for the chroma channels. Application of the constraint to split options to chroma channels can result in differing minimum block sizes for luma versus chroma, for example when the frame data is in the 4:2:0 chroma format or the 4:2:2 chroma format. Each split produces sub-regions with a side dimension either unchanged, halved or quartered, with respect to the containing region. Then, since the CTU size is a power of two, the side dimensions of all CUs are also powers of two.

Figure 6:
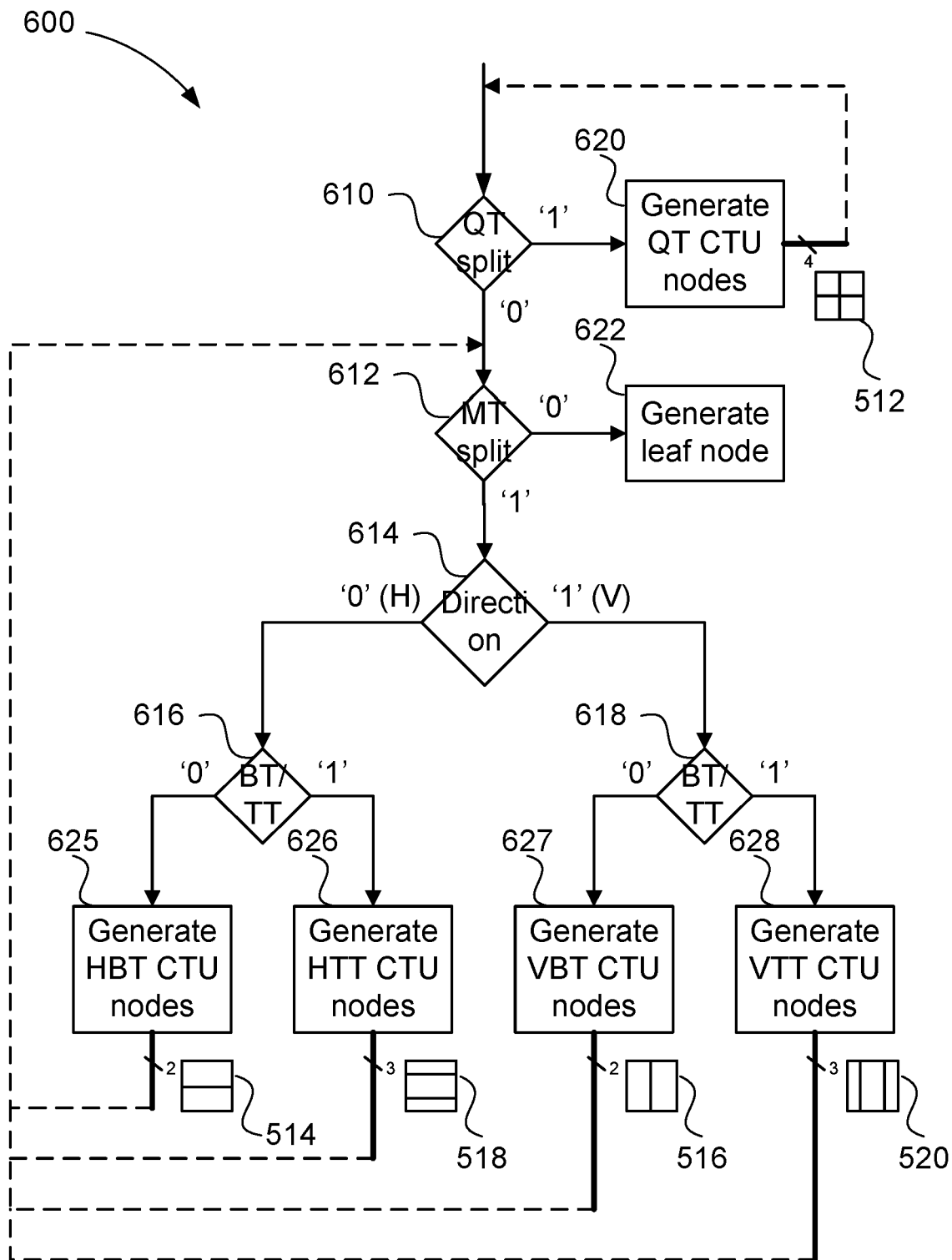
FIG. 6 is a schematic illustration of a dataflow to achieve permitted divisions of a block into one or more blocks in a tree structure of versatile video coding.

FIG. 6 is a schematic flow diagram illustrating a data flow 600 of a QTBTTT (or 'coding tree') structure used in versatile video coding. The QTBTTT structure is used for each CTU to define a division of the CTU into one or more CUs. The QTBTTT structure of each CTU is determined by the block partitioner 310 in the video encoder 114 and encoded into the bitstream 115 or decoded from the bitstream 133 by the entropy decoder 420 in the video decoder 134. The data flow 600 further characterises the permissible combinations available to the block partitioner 310 for dividing a CTU into one or more CUs, according to the divisions shown in FIG. 5.

Starting from the top level of the hierarchy, that is at the CTU, zero or more quad-tree divisions are first performed. Specifically, a Quad-tree (QT) split decision 610 is made by the block partitioner 310. The decision at 610 returning a '1' symbol indicates a decision to split the current node into four sub-nodes according to the quad-tree split 512. The result is the generation of four new nodes, such as at 620, and for each new node, recursing back to the QT split decision 610. Each new node is considered in raster (or Z-scan) order. Alternatively, if the QT split decision 610 indicates that no further split is to be performed (returns a '0' symbol), quad-tree partitioning ceases and multi-tree (MT) splits are subsequently considered.

Firstly, an MT split decision 612 is made by the block partitioner 310. At 612, a decision to perform an MT split is indicated. Returning a '0' symbol at decision 612 indicates that no further splitting of the node into sub-nodes is to be performed. If no further splitting of a node is to be performed, then the node is a leaf node of the coding tree and corresponds to a CU. The leaf node is output at 622.

Alternatively, if the MT split 612 indicates a decision to perform an MT split (returns a '1' symbol), the block partitioner 310 proceeds to a direction decision 614.

The direction decision 614 indicates the direction of the MT split as either horizontal ('H' or '0') or vertical ('V' or '1'). The block partitioner 310 proceeds to a decision 616 if the decision 614 returns a '0' indicating a horizontal direction. The block partitioner 310 proceeds to a decision 618 if the decision 614 returns a '1' indicating a vertical direction.

At each of the decisions 616 and 618, the number of partitions for the MT split is indicated as either two (binary split or 'BT' node) or three (ternary split or 'TT') at the BT/TT split. That is, a BT/TT split decision 616 is made by the block partitioner 310 when the indicated direction from 614 is horizontal and a BT/TT split decision 618 is made by the block partitioner 310 when the indicated direction from 614 is vertical.

The BT/TT split decision 616 indicates whether the horizontal split is the binary split 514, indicated by returning a '0', or the ternary split 518, indicated by returning a '1'. When the BT/TT split decision 616 indicates a binary split, at a generate HBT CTU nodes step 625 two nodes are generated by the block partitioner 310, according to the binary horizontal split 514. When the BT/TT split 616 indicates a ternary split, at a generate HTT CTU nodes step 626 three nodes are generated by the block partitioner 310, according to the ternary horizontal split 518.

The BT/TT split decision 618 indicates whether the vertical split is the binary split 516, indicated by returning a '0', or the ternary split 520, indicated by returning a '1'. When the BT/TT split 618 indicates a binary split, at a generate VBT CTU nodes step 627 two nodes are generated by the block partitioner 310, according to the vertical binary split 516. When the BT/TT split 618 indicates a ternary split, at a generate VTT CTU nodes step 628 three nodes are generated by the block partitioner 310, according to the vertical ternary split 520. For each node resulting from steps 625-628 recursion of the data flow 600 back to the MT split decision 612 is applied, in a left-to-right or top-to-bottom order, depending on the direction 614. As a consequence, the binary tree and ternary tree splits may be applied to generate CUs having a variety of sizes.

Figure 7A:
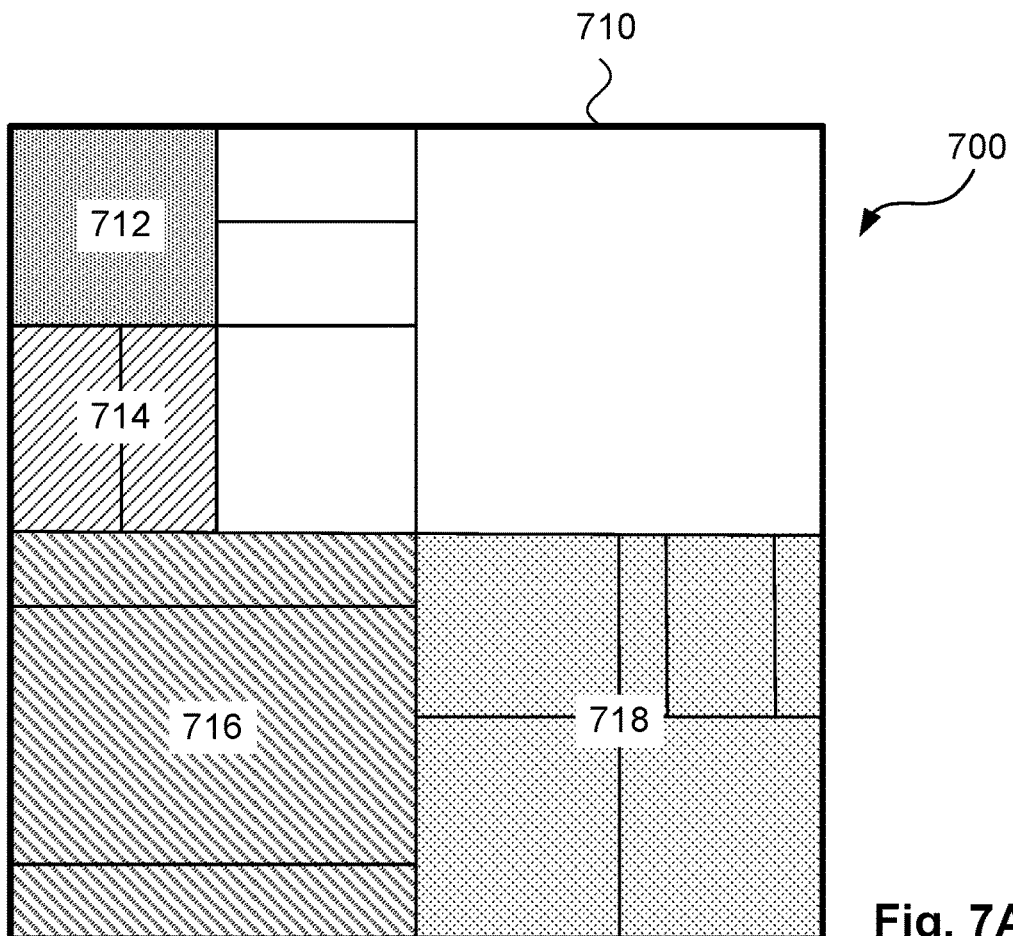
FIGS. 7A and 7B show an example division of a coding tree unit (CTU) into a number of coding units (CUs)
Figure 7B:
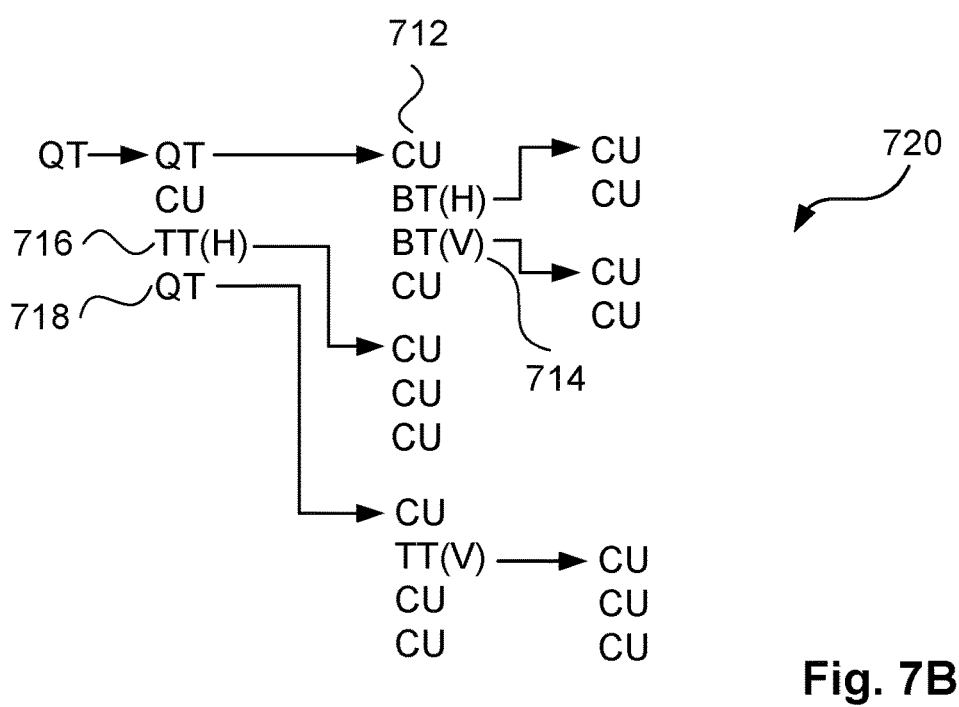

FIGS. 7A and 7B provide an example division 700 of a CTU 710 into a number of CUs or CBs. An example CU 712 is shown in FIG. 7A. FIG. 7A shows a spatial arrangement of CUs in the CTU 710. The example division 700 is also shown as a coding tree 720 in FIG. 7B.

At each non-leaf node in the CTU 710 of FIG. 7A, for example nodes 714, 716 and 718, the contained nodes (which may be further divided or may be CUs) are scanned or traversed in a 'Z-order' to create lists of nodes, represented as columns in the coding tree 720. For a quad-tree split, the Z-order scanning results in top left to right followed by bottom left to right order. For horizontal and vertical splits, the Z-order scanning (traversal) simplifies to a top-to-bottom scan and a left-to-right scan, respectively. The coding tree 720 of FIG. 7B lists all nodes and CUs according to the applied scan order. Each split generates a list of two, three or four new nodes at the next level of the tree until a leaf node (CU) is reached.

Having decomposed the image into CTUs and further into CUs by the block partitioner 310, and using the CUs to generate each residual block (324) as described with reference to FIG. 3, residual blocks are subject to forward transformation by the video encoder 114. An equivalent inverse transform process is performed in the video decoder 134 to obtain TBs from the bitstream 133.

In the video encoder 114, the quantised coefficients 336 may be rearranged to a one-dimensional list by performing a two-level backward diagonal scan. Similarly, in the video decoder 134, the quantised coefficients 424 may be rearranged from a one-dimensional list to a two-dimensional collection of sub-blocks by the same two-level backward diagonal scan.

Figure 8A:
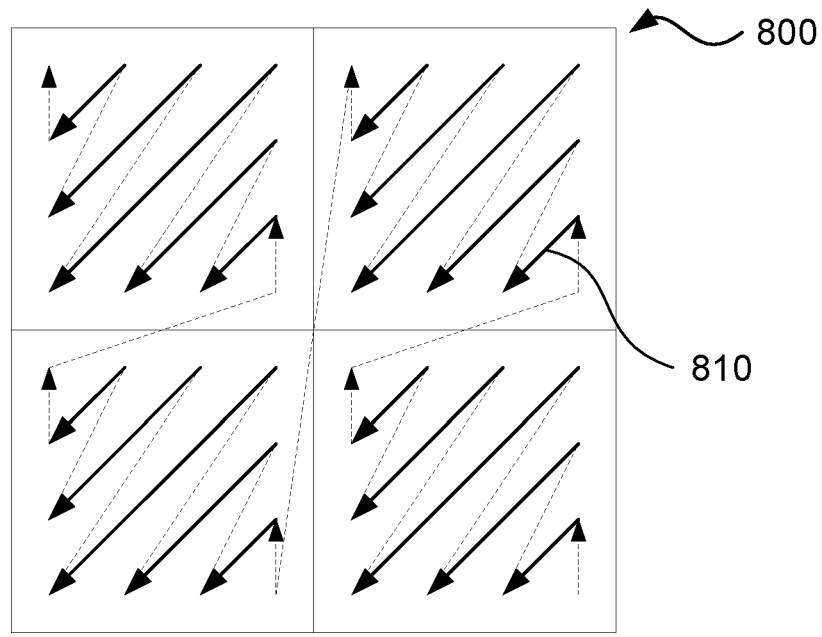
FIG. 8A shows a two-level backward diagonal scan.

FIG. 8A shows a two-level backward diagonal scan 810 of an example 8×8 TB 800. The scan 810 is shown progressing from the bottom-right residual coefficient position of the TB 800 back to the top-left (DC) residual coefficient position of the TB 800. The path of the scan 810 progresses with 4×4 regions, known as sub-blocks, and from one sub-block to the next. For TBs of width or height of two, sub-block sizes of 2×2, 2×8, or 8×2 are available. Scanning within a particular sub-block is either performed or the sub-block skipped, according to a 'coded sub-block flag'. When scanning of a sub-block is skipped all residual coefficients within the sub-block are inferred to have a value of zero. Although the scan 810 is shown commencing from the bottom-right residual coefficient position of the TB 800, for a given set of residual coefficients scanning commences from the position of the 'last significant coefficient', the coefficient being 'last' when order of coefficients is considered as progressing from the DC coefficient instead of the scan order.

Figure 8B:
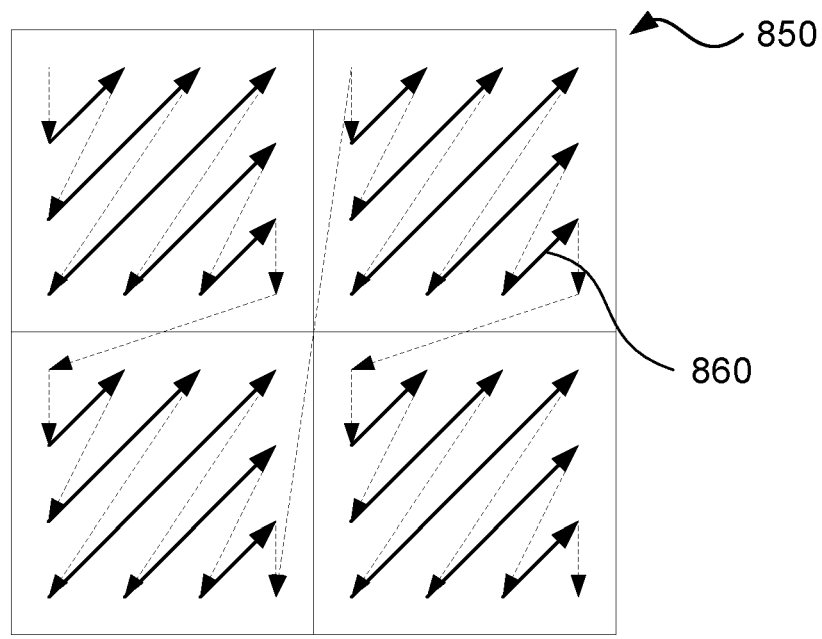
FIG. 8B shows a two-level forward diagonal scan.

FIG. 8B shows an alternative, two-level forward diagonal scan 860 of an example 8×8 TB 850, which is used when the TSRC process is selected. When the TSRC process is used in the video encoder 114, the quantised coefficients 336 are rearranged to a one-dimensional list by the scan 860. Similarly, if the TSRC process is used for the current TB in the video decoder 134, the quantised coefficients 424 are rearranged from a one-dimensional list to a two-dimensional collection of sub-blocks by the scan 860. The scan 860 is shown progressing from the top-left (DC) residual coefficient position of the TB 850 to the bottom-right residual coefficient position of the TB 850. Unlike the scan 810, the scan 860 does not terminate at a 'last significant coefficient'.

FIGS. 8A and 8B show scan patterns typically used in VVC. The examples described herein use the scan pattern 810 for encoding residual coefficients that have been transformed by the module 326 and the scan pattern 860 is used for transform-skipped transform blocks. However, in some implementations other scan patterns can be used.

As described above, the transform coefficients 332 are the same as the residual coefficients 324 when transform skip mode is used. Therefore, regardless of whether transform skip mode is selected, the transform coefficients 332 may sometimes be referred to as residual coefficients as well. When lossless coding is desired, the video encoder 114 selects transform skip for the current TB and signals a transform skip flag to the bitstream 133 with the value "TRUE". The residual coefficients 332 associated with the current TB are encoded to the bitstream 133. Two residual coding processes are available: a "regular residual coding" (RRC) process, and a "transform skip residual coding" (TSRC) process. In normal operation of the video encoder 114, the TSRC process is selected if transform skip is selected (transform skip flag has the value "TRUE"), and the RRC process is selected otherwise (transform skip flag has the value "FALSE"). However, it is typically undesirable for the encoding of the residual coefficients 332 to be handled exclusively by TSRC in the case of lossless coding.

In one arrangement of the video encoder 114, a TSRC disabled flag is signalled in the bitstream 133. The TSRC disabled flag may be signalled at a relatively high level such as once per sequence, or once per picture, so that the relative cost of signalling the TSRC disabled flag is low. High level syntax elements are typically grouped in a parameter set, such as a "sequence parameter set" (SPS) for sequence-level flags, or a "picture parameter set" (PPS) for parameter-level flags. The TSRC disabled flag may be set to "TRUE" when the video data 113 belongs to a class which is unlikely to be suitable for (in terms of coding loss and reproduction of features) encoding with the TSRC process. An example of video data unsuitable for encoding with TSRC is natural scene content. The TSRC disabled flag may be set to "FALSE" when the video data 113 belongs to a class which is likely to encode well with the TSRC process. Video data suitable for encoding with the TSRC process includes artificial screen content.

If the video encoder 114 selects transform skip for the current TB, and the TSRC disabled flag is set to "TRUE", the residual coefficients 332 are encoded to the bitstream 133 using the RRC process. Similarly, if the video decoder 134 determines that transform skip is used for the current TB, and the TSRC disabled flag is set to "TRUE", then residual coefficients 432 are decoded from the bitstream 133 using the RRC process.

Figure 9:
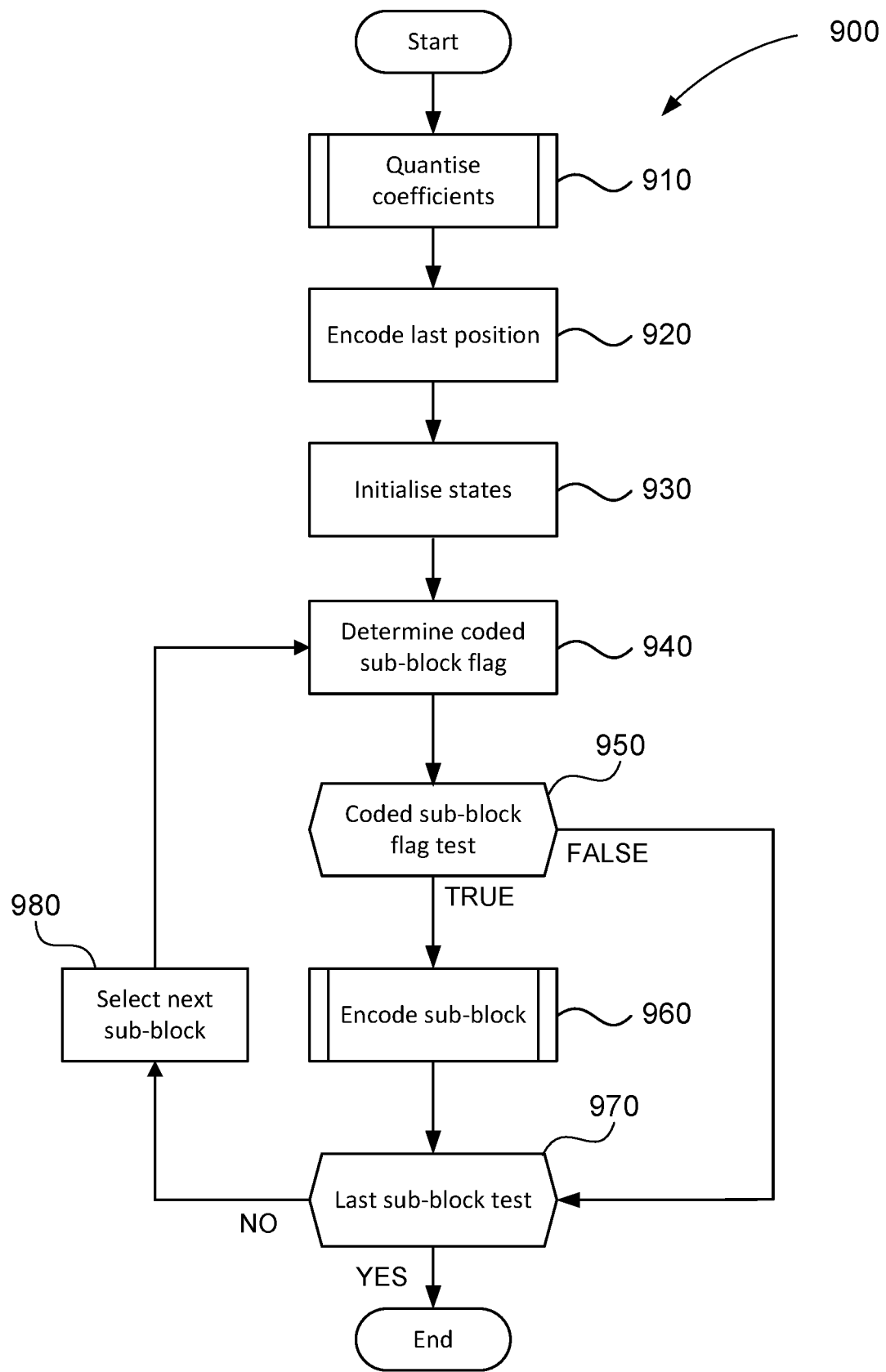
FIG. 9 shows a method for encoding a transform block of residual coefficients.

FIG. 9 shows a method 900 for encoding a transform block of residual coefficients 332 using the RRC process. The method 900 may be embodied by apparatus such as a configured FPGA, an ASIC, or an ASSP. Additionally, the method 900 may be performed by the video encoder 114 under execution of the processor 205, As such, the method 900 may be implemented as modules of the software 233 stored on computer-readable storage medium and/or in the memory 206.

The method 900 is implemented in some arrangements by the video encoder 114 at the quantiser 334 on receiving the residual coefficients 332, and then the entropy encoder 338. The method 900 begins at a quantise coefficients step 910.

At the quantise coefficients step 910, the step 910 invokes a method 1100, described below in relation to FIG. 11. The method 1100 may be embodied by apparatus such as a configured FPGA, an ASIC, or an ASSP. Additionally, the method 1100 may be performed by the video encoder 114 under execution of the processor 205. As such, the method 1100 may be implemented as modules of the software 233 stored on computer-readable storage medium and/or in the memory 206. The method 1100 quantises the residual coefficients 332, producing quantised coefficients 336. The method 900 proceeds under control of the processor 205 from step 910 to an encode last position step 920.

At the encode last position step 920, the video encoder 114 finds the position of the last significant coefficient in the quantised coefficients 336 for the transform block of residual coefficients 332). The last significant coefficient is determined in relation to the forward direction of an appropriate scan pattern, for example in the direction of the two-level forward diagonal scan 860. A quantised coefficient is significant if the coefficient has any value other than zero. The position of the last significant coefficient is written to the bitstream 133. The method 900 proceeds under control of the processor 205 from step 920 to an initialise states step 930.

At the initialise states step 930, a quantiser state Qstate is set to the value zero. Additionally, a sub-block containing the last significant coefficient is selected at step 930. The method 900 proceeds under control of the processor 205 from step 930 to a determine coded sub-block flag step 940.

The description herein refers to some flags being "TRUE" or "FALSE". Setting to "TRUE" means that the flag value indicates a mode is selected or a requirement is met. Setting to "FALSE" means that the flag value indicates a mode is not selected or a requirement is not met.

At the determine coded sub-block flag step 940, the video encoder 114 determines and sets a coded sub-block flag. If the current selected sub-block is the first sub-block selected in the initialise states step 930, the coded sub-block flag is set to "TRUE" but is not encoded to the bitstream 133. If the current selected sub-block is identified as a last sub-block, as described below in relation to a last sub-block test 970, the coded sub-block flag is set to "TRUE" but is not encoded to the bitstream 133.

Otherwise, the video encoder 114 sets the coded sub-block flag to (i) "TRUE" if there is at least one significant coefficient in the 4×4 quantised coefficients belonging to the selected sub-block, or (ii) "FALSE" if there are no significant coefficients, and encodes the coded sub-block flag to the bitstream 133. The method 900 proceeds under control of the processor 205 from step 940 to a coded sub-block flag test step 950.

At the coded sub-block flag test step 950, the method 900 determines the value of the coded sub-block flag. The method 900 proceeds to an encode sub-block step 960 if the coded sub-block flag is set to "TRUE". Otherwise, if the coded sub-block flag is set to "FALSE" the method 900 proceeds to the last sub-block test step 970.

At the encode sub-block step 960, the entropy encoder 338 encodes the quantised coefficients in the selected sub-block to the bitstream 133. The step 960 invokes a method 1300, described below in relation to FIG. 13. The method 900 proceeds under control of the processor from step 960 to the last sub-block test 970.

At the last sub-block test 970, the method 900 operates to determine if the selected sub-block is the last sub-block in the current transform block. If the current selected sub-block is the top-left sub-block of the transform block, the step 900 returns "YES" and the method 900 terminates. Otherwise, if the current selected sub-block is not the top-left sub-block of the transform block, the step 970 returns "NO" and the method 900 proceeds to a select next sub-block step 980.

At the select next sub-block step 980, a next sub-block in the transform block is selected. The next sub-block in the backward diagonal scan order 810 is selected. The method 900 proceeds from step 980 to the determine coded sub-block flag step 940 for the selected sub-block.

Figure 10:
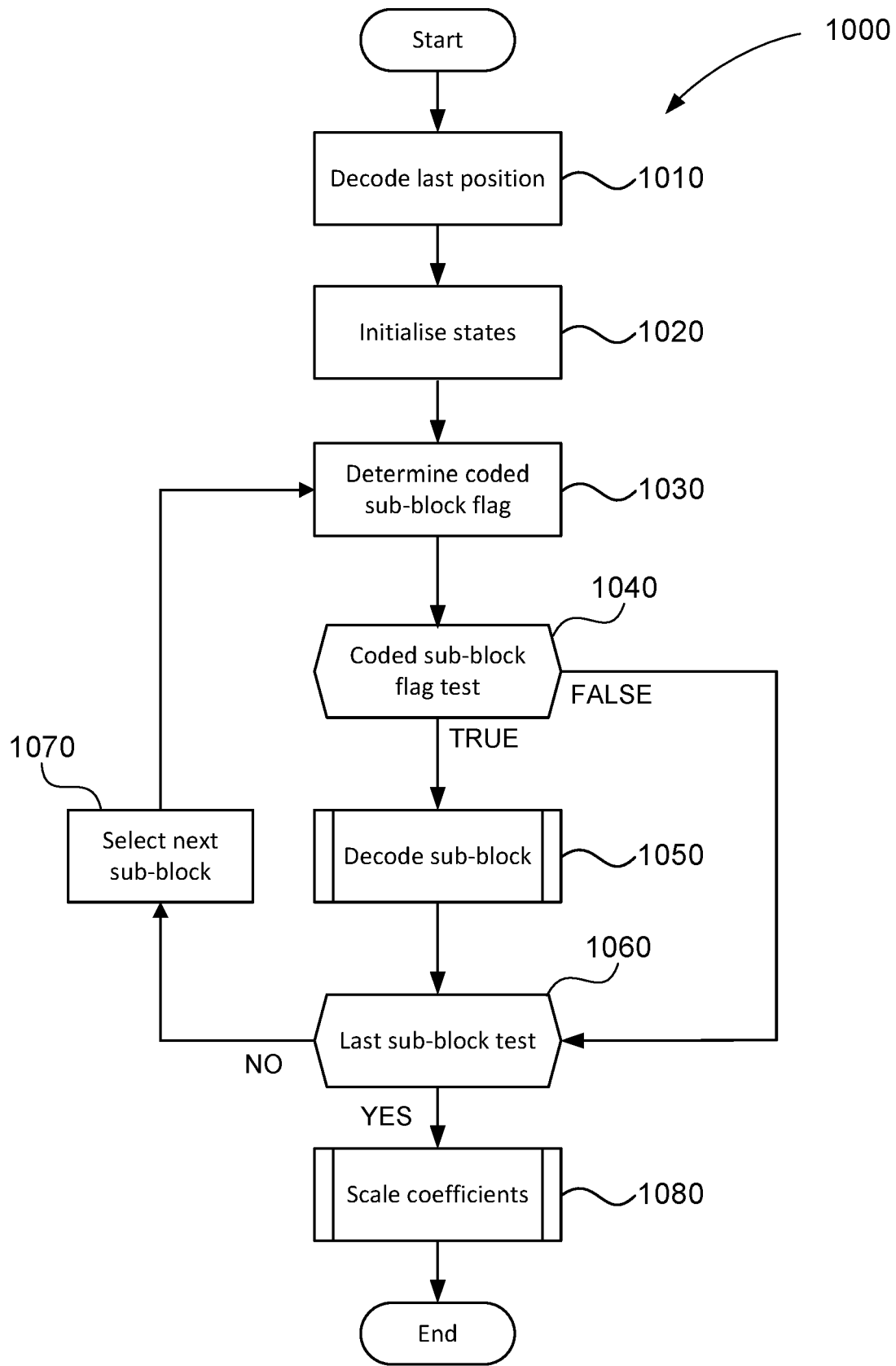
FIG. 10 shows a method for decoding a transform block of residual coefficients.

FIG. 10 shows a method 1000 for decoding a transform block of residual coefficients 432 by the RRC process. The method 1000 may be embodied by apparatus such as a configured FPGA, an ASIC, or an ASSP. Additionally, the method 1000 may be performed by the video decoder 134 under execution of the processor 205. As such, the method 1000 may be implemented as modules of the software 233 stored on computer-readable storage medium and/or in the memory 206.

The method 1000 is implemented in some arrangements by the video encoder 134 at the entropy decoder 420 on receiving the bitstream 133, and at the dequantiser module 428. The method 1000 begins at a decode last position step 1010.

At the decode last position step 1010, a last significant coefficient position for the transform block of residual coefficients 432 is decoded from the bitstream 133. The method 1000 proceeds under control of the processor 205 from step 1010 to an initialise states step 1020.

At the initialise states step 1020, the video decoder 134 initialises a quantiser state Qstate to the value zero. Additionally, a sub-block containing the last significant coefficient position is selected at step 1020. The method 1000 proceeds under control of the processor 205 from step 1020 to a determine coded sub-block flag step 1030.

At the determine coded sub-block flag step 1030, the video decoder 134 determines a coded sub-block flag. If the current selected sub-block is the first sub-block selected in the initialise states step 1020, the coded sub-block flag is set to "TRUE" (that is, the coded sub-block flag is inferred to be "TRUE"). If the current selected sub-block is identified as a last sub-block as described below in a last sub-block test 1060, the coded sub-block flag is inferred as "TRUE". Otherwise, the video decoder 134 decodes the coded sub-block flag from the bitstream 133. The method 1000 proceeds under control of the processor 205 from step 1030 to a coded sub-block flag test 1040.

At the coded sub-block flag test 1040, the method 1000 tests the value of the coded sub-block flag determined at step 1030. The method 1000 proceeds to a decode sub-block step 1050 if the coded sub-block flag is determined to have a value of "TRUE" at step 1040. Otherwise, if the coded sub-block flag is determined to have a value of "FALSE" at step 1040, all the quantised coefficients in the current selected sub-block are assigned a value of zero, and the method 1000 proceeds to a last sub-block test 1060.

At the decode sub-block step 1050, the entropy decoder 420 decodes quantised coefficients for the selected sub-block from the bitstream 133. The step 1050 invokes a method 1400, described below in relation to FIG. 14. The method 1000 proceeds under control of the processor 205 to the last sub-block test 1060.

At the last sub-block test 1060, if the current selected sub-block is the top-left sub-block of the transform block, the step 1060 returns "YES" and the method 1000 proceeds to a scale coefficients step 1080. Otherwise, the step 1060 returns "NO" and the method 1000 proceeds to a select next sub-block step 1070.

At the select next sub-block step 1070, the next sub-block in the backward diagonal scan order 810 is selected. The method 1000 proceeds under control of the processor 205 from step 1070 to the determine coded sub-block flag step 1030.

At the scale coefficients step 1080, the dequantiser module 428 applies scaling to the quantised coefficients 424, producing reconstructed residual coefficients 432. The sub-block is decoded by reconstructing the residual coefficients of the sub-block using decoded sign bits. The step 1080 invokes a method 1200, described below in relation with FIG. 12. The method 1000 terminates on execution of the step 1080.

Figure 11:
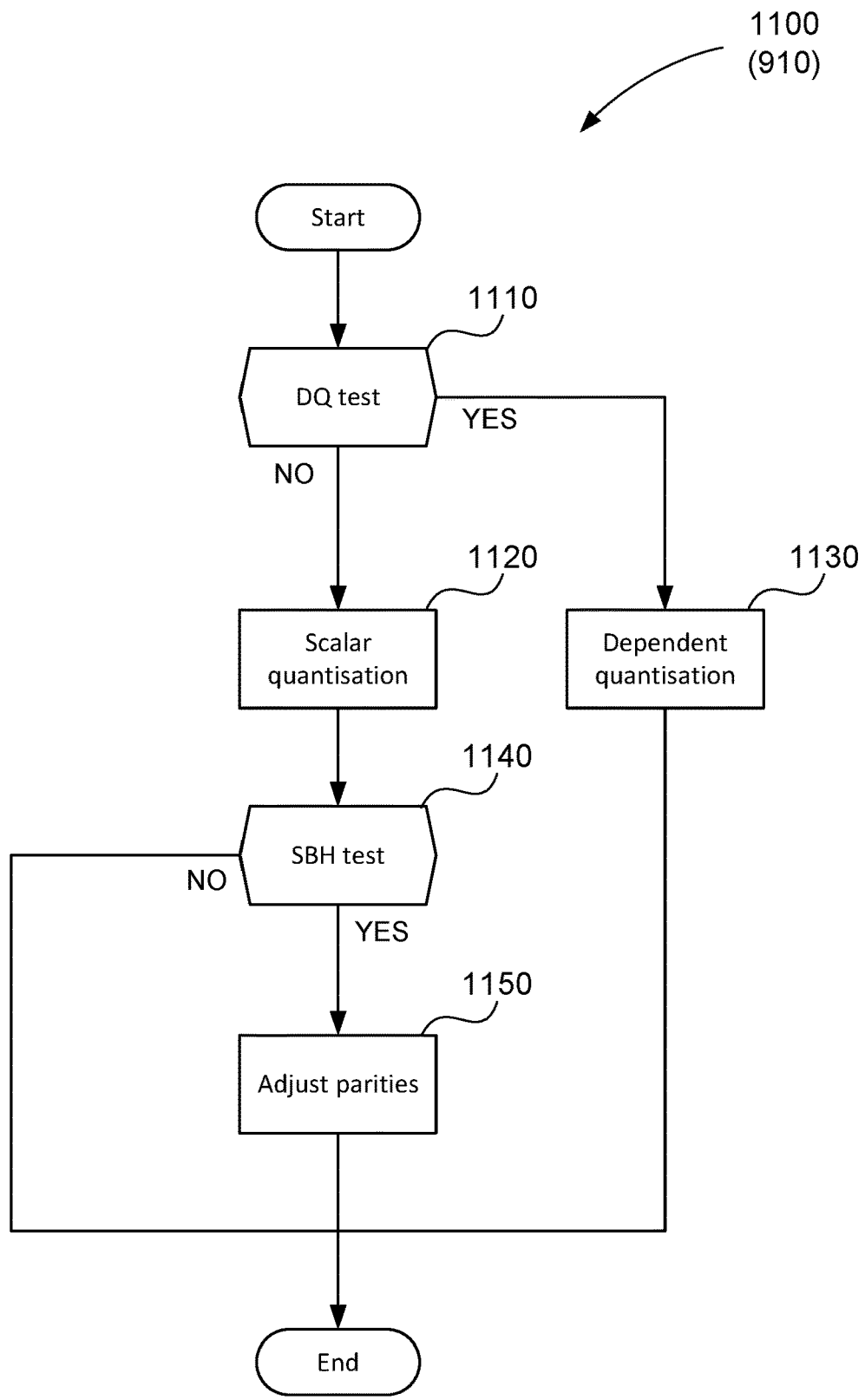
FIG. 11 shows a method for quantising a transform block of residual coefficients as performed by the method of FIG. 9.

FIG. 11 shows the method 1100 for quantising the residual coefficients 332 of a transform block, producing quantised coefficients 336. The method 1100 is implemented for the TB at step 910 of the method 900. The method 1100 begins at a DQ test 1110.

At the DQ test 1110, the video encoder 114 determines whether dependent quantisation is used to quantise the residual coefficients 332. The video encoder 114 checks the value of an enable dependent quantisation flag, which is signalled in the bitstream 133 as high-level syntax. The enable dependent quantisation flag determines whether dependent quantisation is permitted within the scope of the flag. For example, a sequence-level dependent quantisation flag determines whether dependent quantisation is permitted when coding the entire video sequence. A picture-level dependent quantisation flag determines whether dependent quantisation is permitted when coding the current picture, and would take priority over the value of the sequence-level dependent quantisation flag. If the enable dependent quantisation flag is "FALSE", the step 1110 returns "NO" and the method 1100 proceeds to a scalar quantisation step 1120.

In one arrangement of the DQ test 1110, if the enable dependent quantisation flag is "TRUE", the video encoder 114 also checks the value of the transform skip flag for the current TB. If the enable dependent quantisation flag is "TRUE" and the transform skip flag is "TRUE", the step 1110 returns "NO" and the method 1100 proceeds to the scalar quantisation step 1120. Otherwise, if the enable dependent quantisation flag is "TRUE" and the transform skip flag is "FALSE", the step 1110 returns "YES" and the method 1100 proceeds to a dependent quantisation step 1130.

In another arrangement of the DQ test 1110, if the enable dependent quantisation flag is "TRUE", the video encoder 114 also checks the value of the TSRC disabled flag. If the enable dependent quantisation flag is "TRUE" and the TSRC disabled flag is "TRUE", the step 1110 returns "NO" and the method 1100 proceeds to the scalar quantisation step 1120. Otherwise, if the enable dependent quantisation flag is "TRUE" and the TSRC disabled flag is "FALSE", the step 1110 returns "YES" and the method 1100 proceeds to the dependent quantisation step 1130.

In yet another arrangement of the DQ test 1110, if the enable dependent quantisation flag is "TRUE", the video encoder 114 also checks the value of a quantisation parameter (QP) for the current TB. The QP indicates the degree of quantisation that will be applied to the residual coefficients 332. The QP is determined from an initial $QP_i$ and an offset dependent on a bit depth BD of the video encoder 114 as $QP=QP_i+6*(BD-8)$. For example, if $QP_i$ is four and the bit depth is eight, QP is determined to be four. If $QP_i$ is −8 and the bit depth is ten, QP is determined as four. Typically, a QP of four indicates that the residual coefficients will not be quantised, and therefore lossless operation is possible. However, higher values of QP may still achieve lossless operation. For example, if the video data 113 was originally captured at a bit depth of 8 but is supplied to the video encoder 114 at a higher bit depth, lossless operation is possible at a higher QP. For example, if the video data 113 was captured at a bit depth of 8 but is supplied to the video encoder 114 at a bit depth of 10, lossless operation is possible at QPs of 4, 10, or 16. The QP at which lossless operation is possible may be indicated by a minimum QP for transform skip blocks, which is signalled in a high level syntax parameter set. If the enable dependent quantisation flag is "TRUE" and the QP is four (or any value which indicates lossless operation), the step 1110 returns "NO" and the method 1100 proceeds to the scalar quantisation step 1120. Otherwise, if the enable dependent quantisation flag is "TRUE" and the QP is not four (or a similar value indicating lossless operation), the step 1110 returns "YES" and the method 1100 proceeds to the dependent quantisation step 1130.

At the scalar quantisation step 1120, the residual coefficients 332 are represented as r[n]. Then quantised coefficients q[n] are produced by quantising the residual coefficients r[n] according to Equation (1) below:

$$q[n]=(k*r[n]+\text{offset})>>q\text{bits} \quad (1)$$

In Equation (1) k is a scaling factor, qbits is a coarse quantisation factor, and offset controls placement of the quantisation thresholds. k, qbits, and offset are determined based on the value of the quantisation parameter for the current TB. For example, if the QP is four, then k=1, qbits=0, and offset=0. Then when the QP is four, q[n]=r[n] and no loss is incurred at the scalar quantisation step. The method 1100 proceeds under control of the processor 205 from step 1120 to an SBH test 1140.

At the dependent quantisation step 1130, each of the residual coefficients r[n] may be quantised by one of a choice of multiple scalar quantisers. For the same QP, the scalar quantisers have the same quantisation partition size, but with quantisation thresholds offset relative to each other. The scalar quantiser for a particular residual coefficient r[n] is dependent on the current quantiser state Qstate which is updated per coefficient, and by the parity (the least significant bit) of the resulting q[n]. Because of the dependency on previous state, the optimal quantisation outcome is not determined on a per-coefficient basis. One efficient method of determining the optimal quantisation outcome is by constructing a "trellis" of the possible quantisation states at each coefficient position. The optimal quantisation outcome may be found by equivalently finding the best path through the trellis. The most suitable trellis path may be determined by applying the Viterbi algorithm. The method 1100 terminates on execution of step 1130.

At the SBH test 1140, the video encoder 114 determines whether sign bit hiding is used to modify the quantised coefficients q[n] prior to encoding the coefficients of the TB. The video encoder 114 checks the value of a enable sign bit hiding flag. The enable sign bit hiding flag may be signalled in the bitstream 133 as high-level syntax. For example, the enable sign bit hiding flag may be signalled in a picture header. If the enable dependent quantisation flag is "TRUE", the enable sign bit hiding flag is implicitly "FALSE". If the enable sign bit hiding flag is "FALSE", then the step 1140 returns "NO" and the method 1100 terminates.

In one arrangement of the SBH test 1140, the determination depends on the value of the enable sign bit hiding flag and the value of the transform skip flag for the current TB. If the enable sign bit hiding flag is "TRUE", the video encoder 114 also checks the value of the transform skip flag for the current TB. If the enable sign bit hiding flag is "TRUE" and the transform skip flag is "TRUE", the step 1140 returns "NO" and the method 1100 terminates. Otherwise, if the enable sign bit hiding flag is "TRUE" and the transform skip flag is "FALSE", the step 1140 returns "YES" and the method 1100 proceeds to an adjust parities step 1150.

In another arrangement of the SBH test 1140, the determination depends on the value of the enable sign bit hiding flag and the value of the TSRC disabled flag. If the enable sign bit hiding flag is "TRUE", then the video encoder 114 also checks the value of the TSRC disabled flag. If the enable sign bit hiding flag is "TRUE" and the TSRC disabled flag is "TRUE", then the step 1140 returns "NO" and the method 1100 terminates. Otherwise, if the enable sign bit hiding flag is "TRUE" and the TSRC disabled flag is "FALSE", the step 1140 returns "YES" and the method 1100 proceeds to the adjust parities step 1150.

In yet another arrangement of the SBH test 1140, the determination depends on the value of the enable sign bit hiding flag and the value of the quantisation parameter (QP) for the current TB. If the enable sign bit hiding flag is "TRUE", then the video encoder 114 also checks the value of the QP for the current TB. If the enable sign bit hiding flag is "TRUE" and the QP is four (or any value which indicates lossless operation), then the step 1140 returns "NO" and the method 1100 terminates. Otherwise, if the enable sign bit hiding flag is "TRUE" and the QP is not four (or a similar value indicating lossless operation), the step 1140 returns "YES" and the method 1100 proceeds to the adjust parities step 1150.

At the adjust parities step 1150, the video encoder 114 checks the positions of the first and last significant coefficients for each of the sub-blocks in the current TB. If the difference between the first significant position and the last significant position of a sub-block is greater than a threshold (typically three), sign bit hiding will be used for that sub-block. For each sub-block where sign bit hiding will be used, the video encoder 114 checks the sign of the first significant coefficient in the sub-block and adjusts the parities of the coefficients in the sub-block accordingly. The parity of a coefficient is zero if the coefficient is even, and one if the coefficient is odd. The sum of parities of multiple coefficients is zero if the number of odd coefficients is odd, and one if the number of odd coefficients is even. If the sign of the first significant coefficient in the sub-block is positive, then the coefficients in the sub-block are adjusted so that the sum of parities is zero. If the sign of the first significant coefficient in the sub-block is negative, then the coefficients in the sub-block are adjusted so that the sum of parities is one. The method 1100 terminates after execution of the step 1150.

Figure 12:
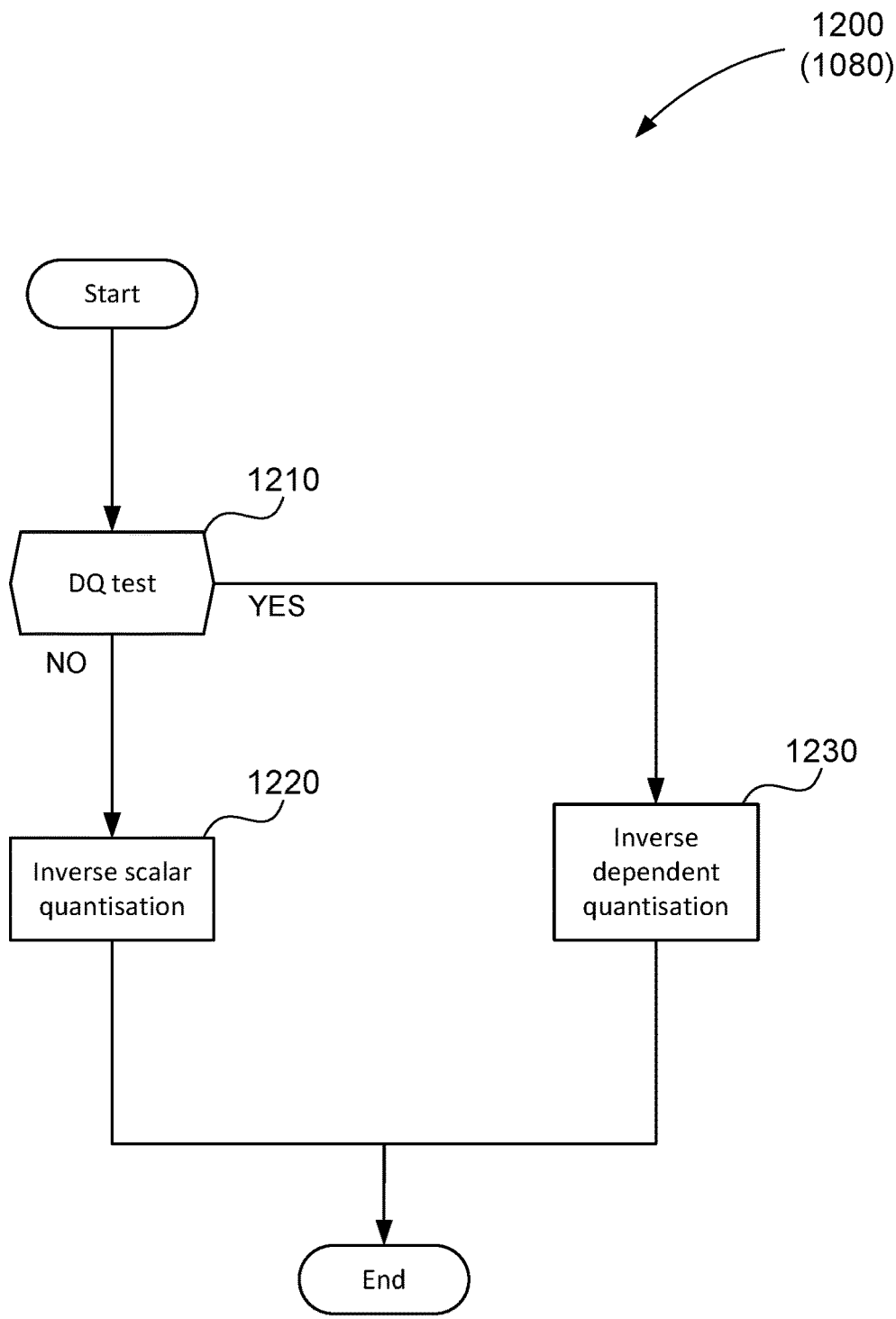
FIG. 12 shows a method for scaling a transform block of quantised coefficients as performed by the method of FIG. 10.

FIG. 12 shows the method 1200 for applying scaling to the quantised coefficients 424, producing reconstructed residual coefficients 432. The method 1200 may be embodied by apparatus such as a configured FPGA, an ASIC, or an ASSP. Additionally, the method 1200 may be performed by the video decoder 134 under execution of the processor 205. As such, the method 1200 may be implemented as modules of the software 233 stored on computer-readable storage medium and/or in the memory 206. The method 1200 is implemented at step 1080 of the method 1000. The method 1200 begins at a DQ test 1210.

At the DQ test 1210, the video decoder 134 determines whether dependent quantisation is used to dequantise the quantised coefficients 424. The video decoder 134 checks the value of an enable dependent quantisation flag, which may be decoded from the bitstream 133, or inferred based on the value of other high-level syntax flags. If the enable dependent quantisation flag is "FALSE", the step 1210 returns "NO" and the method 1200 proceeds to an inverse scalar quantisation step 1220.

In one arrangement of the DQ test 1210, if the enable dependent quantisation flag is "TRUE", then the video decoder 134 also checks the value of the transform skip flag for the current TB. If the enable dependent quantisation flag is "TRUE" and the transform skip flag is "TRUE", then the step 1210 returns "NO" and the method 1100 proceeds to the inverse scalar quantisation step 1220. Otherwise, if the enable dependent quantisation flag is "TRUE" and the transform skip flag is "FALSE", the step 1210 returns "YES" and the method 1100 proceeds to an inverse dependent quantisation step 1230.

In another arrangement of the DQ test 1210, if the enable dependent quantisation flag is "TRUE", then the video decoder 134 also checks the value of the TSRC disabled flag. If the enable dependent quantisation flag is "TRUE" and the TSRC disabled flag is "TRUE", then the step 1210 returns "NO" and the method 1100 proceeds to the inverse scalar quantisation step 1220. Otherwise, if the enable dependent quantisation flag is "TRUE" and the TSRC disabled flag is "FALSE", the step 1210 returns "YES" and the method 1100 proceeds to the inverse dependent quantisation step 1230.

In yet another arrangement of the DQ test 1210, if the enable dependent quantisation flag is "TRUE", then the video decoder 134 also checks the value of a quantisation parameter (QP) for the current TB. If the enable dependent quantisation flag is "TRUE" and the QP is four (or any value which indicates lossless operation), then the step 1210 returns "NO" and the method 1100 proceeds to the inverse scalar quantisation step 1220. Otherwise, if the enable dependent quantisation flag is "TRUE" and the QP is not four (or a similar value indicating lossless operation), the step 1210 returns "YES" and the method 1100 proceeds to the inverse dependent quantisation step 1230.

At the inverse scalar quantisation step 1220, the video decoder 134 scales the quantised coefficients 424, producing reconstructed residual coefficients 432. The quantised coefficients 424 are represented as q[n]. The reconstructed residual coefficients r[n] are produced by scaling the quantised coefficients q[n] according to Equation (2) below:

$$r[n] = (s*q[n]) \ll \left(\frac{QP}{6}\right) \quad (1)$$

In Equation (2), s is a scaling factor determined based on the value of QP for the current TB. For example, if the QP is four, then s=1 and r[n]=q[n]. The method 1200 terminates on execution of the step 1220.

At the inverse dependent quantisation step 1230, the video decoder 134 applies inverse dependent quantisation to the quantised coefficients 424, producing reconstructed residual coefficients 432. The quantiser state Qstate is initially reset to zero. The quantised coefficients 424 are represented as q[n]. Each coefficient position n is visited in the backward diagonal scan order 810, and each reconstructed residual coefficient r[n] is calculated according to the equations (3):

$$g[n] = \begin{cases} \text{sign}(q[n])*(2*|q[n]|) & \text{if } Qstate = 0, 1 \\ \text{sign}(q[n])*(2*|q[n]|-1) & \text{otherwise} \end{cases} \quad (3)$$

$$r[n] = (s*q[n]) \ll \left(\frac{QP}{6} - 1\right)$$

In Equation (3), s is a scaling factor determined based on the value of QP for the current TB.

After each reconstructed residual coefficient r[n] is calculated, the quantiser state is updated based on the parity of q[n] according to Table 1:

TABLE 1

| Qstate transitions | | |
| --- | --- | --- |
| Previous Qstate | Updated Qstate (even parity) | Updated Qstate (odd parity) |
| 0 | 0 | 2 |
| 1 | 2 | 0 |
| 2 | 1 | 3 |
| 3 | 3 | 1 |

The method 1200 terminates on execution of the step 1230.

In order to exploit the statistical characteristics of the quantised coefficients 336, the quantised coefficients are binarised by the video encoder 114 (typically by the entropy encoder 338) into a number of syntax elements prior to encoding. For example, because the quantised coefficients 336 often have a value of zero, one syntax element is a significance flag, which is set to "FALSE" for a quantised coefficient with a value of zero. If the significance flag is set to "FALSE", no further syntax elements for the associated quantised coefficient are signalled. The significance flag may be encoded to the bitstream 133 by using the context-adaptive binary arithmetic coding (CABAC) entropy coder.

Although the CABAC coder encodes context coded syntax elements relatively efficiently, limiting the number of context coded syntax elements is generally desirable to minimise computational requirements and cost for hardware implementations. Therefore, after the quantised coefficients 336 are binarised into a number of syntax elements by the entropy encoder 338, some syntax elements are context coded to the bitstream 133, while other syntax elements are bypass coded to the bitstream 133. The total number of context coded syntax element bins is limited per transform block. In the VVC standard the limit is set at 1.75 bins per sample. For example, for an 8×8 transform block which consists of sixty-four samples, a context coded bin budget is set at one hundred and twelve (112) bins. Over the course of encoding a TB to the bitstream 133, the remaining context coded bin budget is tracked and decremented whenever a syntax element is context coded. When the remaining context coded bin budget is exhausted, any remaining quantised coefficients and the associated syntax elements must be bypass coded.

Figure 13:
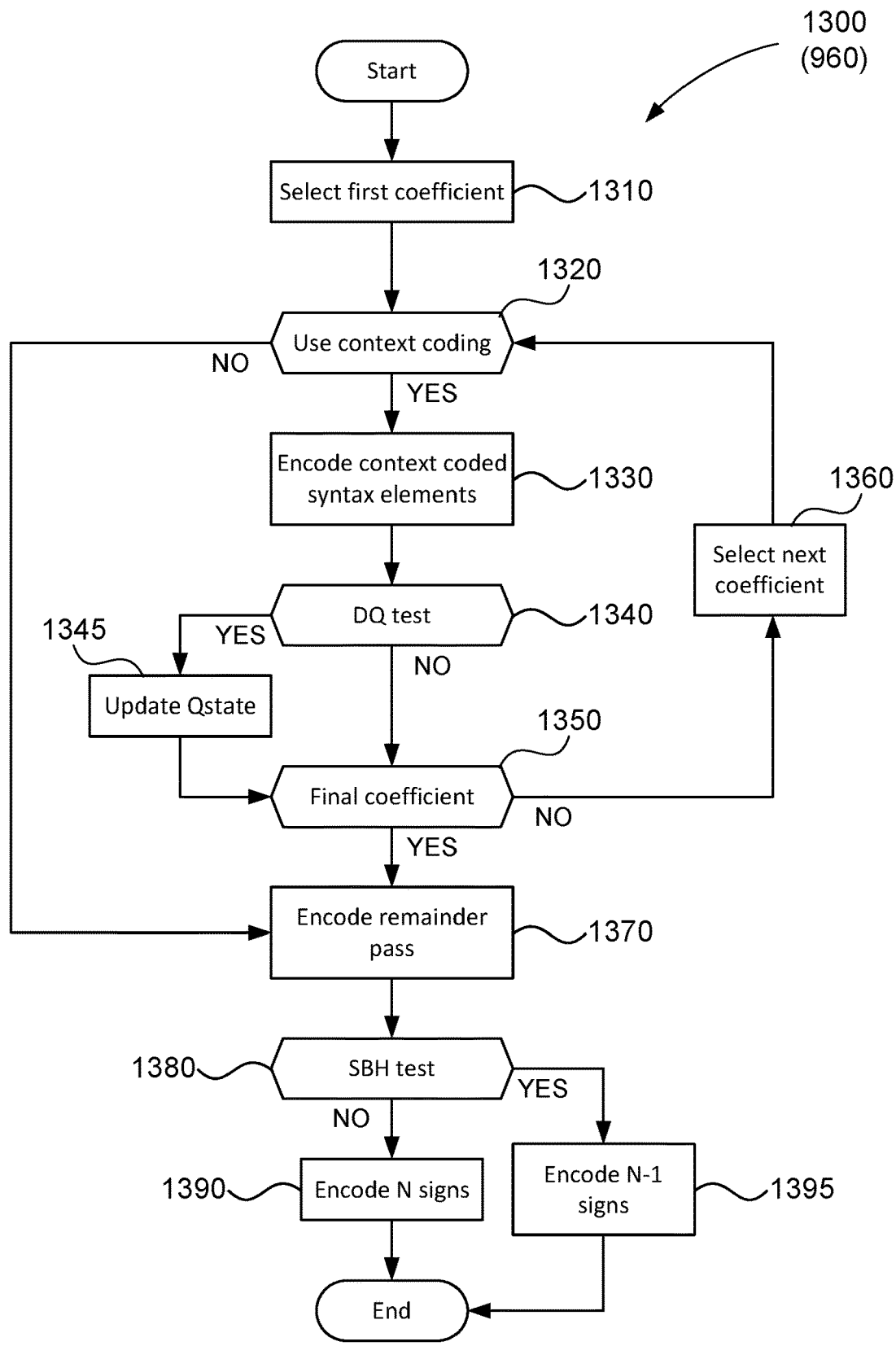
FIG. 13 shows a method for encoding a sub-block of quantised coefficients as performed by the method of FIG. 9.

FIG. 13 shows the method 1300 for encoding the quantised coefficients (336) of the current selected sub-block to the bitstream 133. The method 1300 is implemented at step 960 of the method 900. The method 1300 may be embodied by apparatus such as a configured FPGA, an ASIC, or an ASSP. Additionally, the method 1300 may be performed by the video encoder 114 under execution of the processor 205. As such, the method 1300 may be implemented as modules of the software 233 stored on computer-readable storage medium and/or in the memory 206. The method 1300 begins at a select first coefficient step 1310.

At the select first coefficient step 1310, the method 1300 selects a quantised coefficient of the current sub-block. If the current sub-block contains the last significant coefficient position, a current selected coefficient is set to the last significant coefficient. Otherwise, if the current sub-block does not contain the last significant coefficient position, the current selected coefficient is set to the bottom-right coefficient of the current sub-block. The method 1300 proceeds to a use context coding check 1320.

At the use context coding check 1320, the video encoder 114 checks whether the remaining context coded bin budget is greater than or equal to four. If the remaining context coded bin budget is greater than or equal to four, the step 1320 returns "YES" and the method 1300 proceeds to an encode context coded syntax elements step 1330. Otherwise, if the current context coded bin budget is less than four, the step 1320 returns "NO" and the method 1300 proceeds to an encode remainder pass step 1370.

At the encode context coded syntax elements step 1330, the video encoder 114 may encode a number of syntax elements to the bitstream 133 using the CABAC coder potentially including a significance flag, a greater than one flag, a parity flag and a greater than three flag. Each bin associated with a syntax element is encoded by the CABAC coder using a 'context model'. The context model for each bin may be selected dependent on the current value of the quantiser state Qstate. Additionally, whenever a context coded bin is encoded by the CABAC coder to the bitstream 133, the remaining context coded bin budget is reduced by one at step 1330.

If at step 1330 the current coefficient is the last significant coefficient, a significance flag is set to "TRUE" but is not encoded to the bitstream 133. If the current selected sub-block is not the first or last sub-block in the backward scan order 810, and the current selected coefficient is the final coefficient as described below in a final coefficient check 1350, and all the significance flags for previous coefficients in the current selected sub-block were "FALSE", the significance flag is set to "TRUE". The significance flag is not encoded to the bitstream 133. If the current coefficient has a magnitude of zero, the significance flag is set to "FALSE" and context coded to the bitstream 133, at the step 1330. Otherwise, the significance flag is set to "TRUE" and context coded to the bitstream 133 at step 1330.

If the current coefficient has a magnitude of one, a greater than one flag is set to "FALSE" and context coded to the bitstream 133 at step 1330. Otherwise, the greater than one flag is set to "TRUE" and context coded to the bitstream 133.

If the current coefficient has a magnitude of at least two, a parity flag is set to "FALSE" if the current coefficient is even, or "TRUE" if the current coefficient is odd. The parity flag is context coded to the bitstream 133 at step 1330. If the current coefficient has a magnitude greater than three, then a greater than three flag is set to "TRUE" and context coded to the bitstream 133 at step 1330. Otherwise if the current coefficient has a magnitude of two or three, the greater then three flag is set to "FALSE" and context coded to the bitstream 133.

The method 1300 proceeds under control of the processor 205 from step 1330 to a DQ test 1340. Depending on the coefficient selected at 1310, the method 1300 progresses to the step 1340 after setting (or in some cases encoding) the significance flag. Otherwise, the method 1300 progresses to the step 1340 after encoding the last appropriate one of the greater than one flag, the parity flag and the greater than three flag.

At the DQ test 1340, the same conditions as checked in the DQ test 1110 are used to determine whether the step 1340 returns "YES" or "NO". If the step 1340 returns "YES", the method 1300 proceeds to an update Qstate step 1345. Otherwise if the step 1340 returns "NO", the method 1300 proceeds to a final coefficient check 1350.

At the update Qstate step 1345, the quantiser state Qstate is updated based on the parity of the current coefficient according to Table 1. The method 1300 proceeds from the step 1345 to the final coefficient check 1350.

At the final coefficient check 1350, the video encoder 114 checks whether the current selected coefficient is the top-left coefficient of the current selected sub-block. If the current selected coefficient is the top-left coefficient of the current selected sub-block, the step 1350 returns "YES" and the method 1300 proceeds to the encode remainder pass step 1370. Otherwise, if the current coefficient is not the top-left coefficient, the step 1350 returns "NO" and the method 1300 proceeds to a select next coefficient step 1360.

At the select next coefficient step 1360, the next coefficient of the current selected sub-block in the backward diagonal scan order 810 is selected. The method 1300 proceeds from the step 1360 to the use context coding check 1320.

At the encode remainder pass step 1370, any remaining magnitudes of the quantised coefficients of the current selected sub-block are binarised and bypass coded to the bitstream 133, for example by the entropy encoder 338. The quantised coefficients are encoded in the backward diagonal scan order 810, for example. If a quantised coefficient was context coded by the CABAC coder (that is, the use context coding check 1320 was passed (returned "YES")), the quantised coefficient at scan position n has a remaining magnitude r[n] if the greater than three flag is "TRUE". The remaining magnitude is determined using Equation (4):

$$r[n]=(x[n]-4)\gg 1, \quad (4)$$

wherein Equation (4), x[n] is the absolute magnitude of the quantised coefficient at scan position n. The magnitude r[n] is binarised and bypass coded to the bitstream 133. If a quantised coefficient was not context coded (the use context coding check 1320 was not passed/returned "NO"), the absolute magnitude x[n] is binarised and bypass coded to the bitstream 133. The method 1300 proceeds from step 1370 to an SBH test 1380.

At the SBH test 1380, the same conditions as checked in the SBH test 1140 are used to determine whether the step 1380 returns "YES" or "NO". If the SBH test 1140 would return "NO", then the step 1380 returns "NO" and the method 1300 proceeds to an encode N signs step 1390. Otherwise, the video encoder 114 checks the positions of the first and last significant coefficients of the current sub-block. If the difference between the first significant position and the last significant position is greater than three, the step 1380 returns "YES" and the method 1300 proceeds to an encode N-1 signs step 1395. Otherwise, the step 1380 returns "NO" and the method 1300 proceeds to the encode N signs step 1390.

As described in relation to step 1140, the sign bit hiding test can be dependent on a number of alternative flags or settings in different implementations. If the enable sign bit hiding flag is set (has a "TRUE" value), different implementations can make the determination based on the transform skip flag for the TB, the TSRC disabled flag, or whether the QP for the TB meets a threshold associated with lossless coding. Accordingly, the step 1380 determine whether sign bit hiding is enabled depending on flags or values associated with the transform block itself or the higher-level value of the TSRC disabled flag. The step 1380 affords some flexibility for implementing lossless coding. Implementations that determine whether sign but hiding is enabled using flags or values associated with a transform block are particularly suitable for allowing flexibility in implementing lossless coding using RRC.

At the encode N signs step 1390, sign bits for any significant coefficients of the current selected sub-block are bypass coded to the bitstream 133. The sign bits are bypass coded to the bitstream 133 based on the backward diagonal scan order 810 for example. The method 1300 terminates after execution of step 1390.

At the encode N-1 signs step 1395, sign bits for the significant coefficients of the current selected sub-block are bypass coded to the bitstream 133 based on the backward diagonal scan order 810. The sign bit associated with the first significant coefficient (which is the last visited in the backward diagonal scan order 810) is not coded to the bitstream 133. In other words, if there are N significant coefficients in the current selected sub-block, N-1 sign bits are bypass coded to the bitstream 133. The method 1300 terminates on execution of step 1395.

Figure 14:
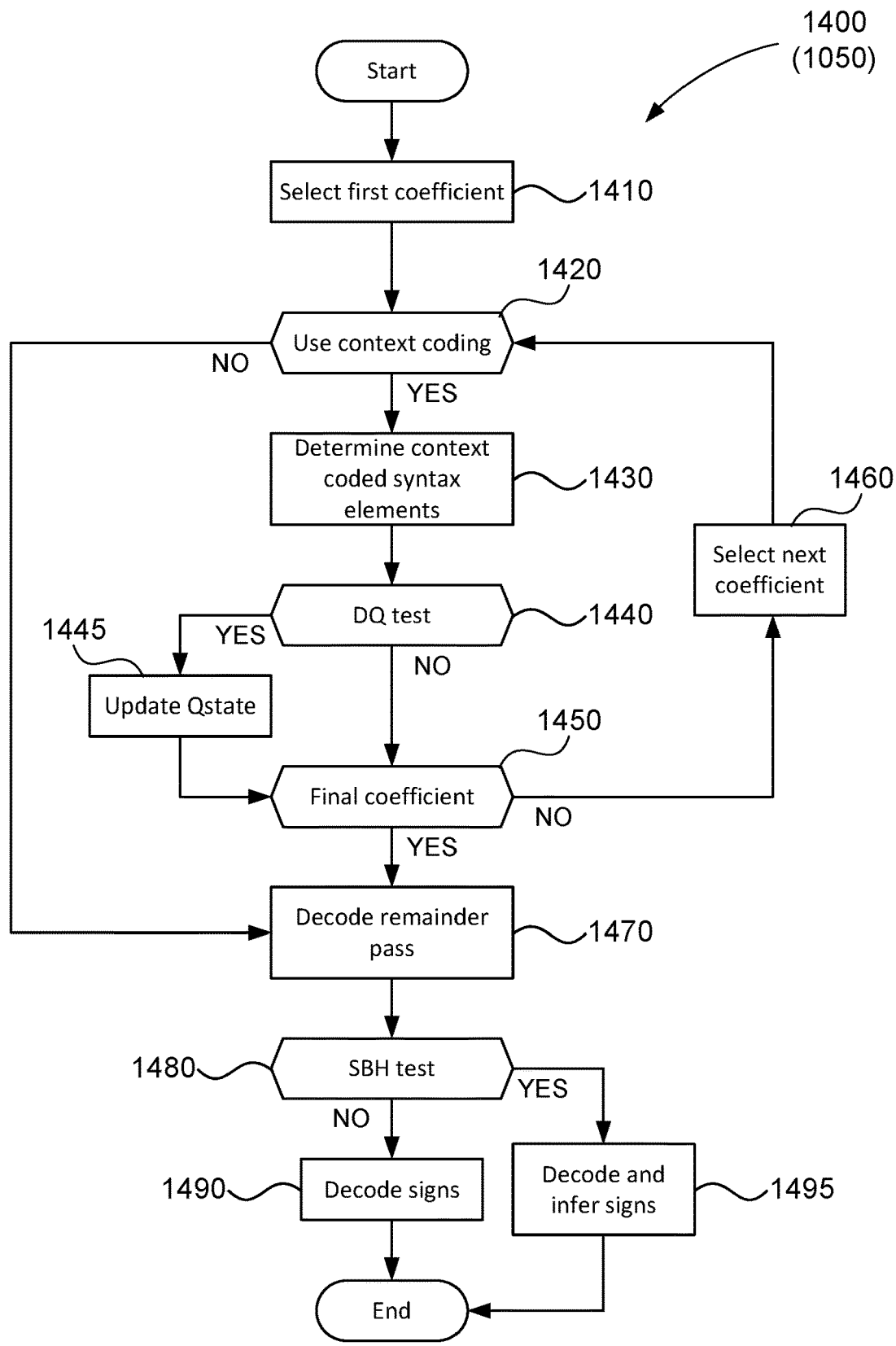
FIG. 14 shows a method for decoding a sub-block of quantised coefficients as performed by the method of FIG. 10.

FIG. 14 shows the method 1400 for decoding quantised coefficients (424) for the current selected sub-block from the bitstream 133. The method 1400 is implemented at step 1050 of the method 1000. The method 1400 may be embodied by apparatus such as a configured FPGA, an ASIC, or an ASSP. Additionally, the method 1400 may be performed by the video decoder 134 under execution of the processor 205. As such, the method 1400 may be implemented as modules of the software 233 stored on computer-readable storage medium and/or in the memory 206. The method 1400 begins at a select first coefficient step 1410.

At the select first coefficient step 1410, the method 1400 selects a first quantised coefficient of the current sub-block. If the current sub-block contains the last significant coefficient position, then a current selected coefficient is set to the last significant coefficient. Otherwise, the current selected coefficient is set to the bottom-right coefficient of the current sub-block. The method 1400 proceeds from the step 1410 to a use context coding check step 1420.

At the use context coding check 1420, the video decoder 134 checks whether the remaining context coded bin budget satisfies a threshold, typically whether the remaining context coded bin budget for the transform block is greater than or equal to four bins. If the remaining budget is greater than or equal to four, the step 1420 returns "YES" and the method 1400 proceeds to a determine context coded syntax elements step 1430. Otherwise, if the remaining CABAC budget is less than the threshold (four bins), the step 1420 returns "NO" and the method 1400 proceeds to a decode remainder pass step 1470.

At the determine context coded syntax elements step 1430, the video decoder 134 may decode a number of context coded syntax elements from the bitstream 133 using the CABAC coder. Each bin associated with a syntax element is decoded by the CABAC coder using a 'context model'. The context model for each bin may be selected dependent on the current value of the quantiser state Qstate. Additionally, whenever a context coded bin is decoded by the CABAC coder from the bitstream 133, the remaining context coded bin budget is reduced by one.

If the current coefficient is the last significant coefficient, a significance flag is inferred as "TRUE" rather than decoded from the bitstream 133. If the current selected sub-block is not the first or last sub-block in the backward scan order 810, and the current selected coefficient is the final coefficient as described below in a final coefficient check 1450, and all the significance flags for previous coefficients in the current selected sub-block were "FALSE", the significance flag is inferred as "TRUE". Otherwise, the significance flag is context decoded from the bitstream 133 at step 1430. If the significance flag is set to "FALSE", then the current selected coefficient is assigned a value of zero and the method 1400 proceeds to a DQ test 1440.

If the significance flag is set to "TRUE", a greater than one flag is context decoded from the bitstream 133 at step 1430. If the greater than one flag is set to "FALSE", the current selected coefficient is assigned a magnitude of one and the method 1400 proceeds to the DQ test 1440.

If the greater than one flag is set to "TRUE", a parity flag and a greater than three flag are context decoded from the bitstream 133. The method 1400 proceeds to the DQ test 1440.

The number of flags determined at step 1430 depends on the position and value of the coefficient selected at step 1410. Progression from step 1430 can occur after the significance flag is inferred or decoded, or after decoding appropriate ones of the greater than one flag, the parity flag or the greater than three flag.

At the DQ test 1440, the same conditions as checked in the DQ test 1210 are used to determine whether the step 1440 returns "YES" or "NO". If the step 1440 returns "YES", then the method 1400 proceeds to an update Qstate step 1445. Otherwise if the step 1440 returns "NO", the method 1400 proceeds to a final coefficient check 1450.

At the update Qstate step 1445, the quantiser state Qstate is updated based on the parity of the current selected coefficient according to Table 1. The parity is zero if the current selected coefficient has a value of zero. The parity is one if the current selected coefficient has a magnitude of one. Otherwise, the parity is zero if the parity flag is set to "FALSE", or the parity is one if the parity flag is set to "TRUE". The method 1400 proceeds from the step 1445 to the final coefficient check 1450.

At the final coefficient check step 1450, the video decoder 134 checks whether the current selected coefficient is the top-left coefficient of the current selected sub-block. If the current selected coefficient is the top-left coefficient of the current selected sub-block, the step 1450 returns "YES" and the method 1400 proceeds to the decode remainder pass step 1470. Otherwise, if the current selected coefficient is not the top-left coefficient, the step 1450 returns "NO" and the method 1400 proceeds to a select next coefficient step 1460.

At the select next coefficient step 1460, the next coefficient of the current selected sub-block in the backward diagonal scan order 810 is selected. The method 1400 proceeds from the step 1460 to the use context coding check 1420.

At the decode remainder pass step 1470, any remaining magnitudes of the quantised coefficients of the current selected sub-block are bypass decoded from the bitstream 133 The quantised coefficients are processed in the backward diagonal scan order 810. If a quantised coefficient was context decoded (the use context coding check 1420 was passed or returned "YES"), and the greater than three flag was decoded with a value of "TRUE", then a remaining magnitude r[n] is bypass decoded from the bitstream 133, where n is the scan position of the quantised coefficient. The absolute magnitude x[n] of the quantised coefficient is determined as x[n]=4+p[n]+2*r[n], where p[n] has a value of zero if the parity flag was decoded as "FALSE", and p[n] has a value of one if the parity flag was decoded as "TRUE".

If a quantised coefficient was context decoded and the greater than one flag was decoded as "TRUE", but the greater than three flag was not decoded, or was decoded as "FALSE", the absolute magnitude is determined as x[n]=2+p [n]. If a quantised coefficient was not context decoded (the use context coding check 1420 was not passed and returned "NO"), the absolute magnitude x[n] is bypass decoded from the bitstream 133. The method 1400 proceeds from step 1470 to an SBH test 1480.

At the SBH test 1480, the video decoder 134 determines whether sign bit hiding is used, that is whether one sign bit for the current selected sub-block is inferred. Tests used at step 1480 relate to tests used at step 1140 on the encoder side. The video decoder 134 checks the value of an enable sign bit hiding flag, which may be signalled in the bitstream 133 as high-level syntax. If the enable dependent quantisation flag is "TRUE", the enable sign bit hiding flag is inferred as "FALSE". If the enable sign bit hiding flag is "FALSE", the step 1480 returns "NO" and the method 1400 proceeds to a decode signs step 1490.

The video decoder 134 checks the positions of the first and last significant coefficients for the current selected sub-block. If the difference between the first significant position and the last significant position is less than or equal to three, then the step 1480 returns "NO" and the method 1400 proceeds to the decode signs step 1490.

In one arrangement of the SBH test 1480, the determination depends on the value of the enable sign bit hiding flag and the value of transform skip flag for the current TB. If the enable sign bit hiding flag is "TRUE" and the difference between the first significant position and the last significant position is greater than three, the video decoder 134 also checks the value of the transform skip flag for the current TB. If the transform skip flag is "TRUE", the step 1480 returns "NO" and the method 1400 proceeds to the decode signs step 1490. Otherwise, if the transform skip flag is "FALSE" the step 1480 returns "YES" and the method 1400 proceeds to a decode and infer signs step 1495.

In another arrangement of the SBH test 1480, the determination depends on the value of the enable sign bit hiding flag and the value of the TSRC disabled flag. If the enable sign bit hiding flag is "TRUE" and the difference between the first significant position and the last significant position is greater than three, the video decoder 134 also checks the value of the TSRC disabled flag. If the TSRC disabled flag is "TRUE", then the step 1480 returns "NO" and the method 1400 proceeds to the decode signs step 1490. Otherwise, if the TSRC disabled flag is "FALSE" the step 1480 returns "YES" and the method 1400 proceeds to the decode and infer signs step 1495.

In yet another arrangement of the SBH test 1480, the determination depends on the value of enable sign bit hiding flag and the value of the quantisation parameter (QP) for the current TB, the difference between the first significant position and the last significant position of the quantisation parameter QP for the transform block. If the enable sign bit hiding flag is "TRUE" and the difference between the first significant position and the last significant position is greater than three, the video decoder 134 also checks the value of the QP for the current TB. If the QP is four (or any value which indicates lossless operation), then step 1480 returns "NO" and the method 1400 proceeds to the decode signs step 1490. Otherwise, if the QP is not four (or a similar value indicating lossless operation), the step 1480 returns "YES" and the method 1400 proceeds to the decode and infer signs step 1495.

At the decode signs pass step 1490, sign bits for any significant coefficients of the current selected sub-block are bypass decoded from the bitstream 133. The sign bits are bypass decoded from the bitstream 133 in the backward diagonal scan order 810. The value of a quantised coefficient is set to −x[n] if the associated sign bit has a value of one. The value of a quantised coefficient is set to x[n] if the associated sign bit has a value of zero. The method 1400 terminates on execution of the step 1490.

At the decode and infer signs step 1495, sign bits for the significant coefficients of the current selected sub-block are bypass decoded from the bitstream 133 in the backward diagonal scan order 810. The sign bit associated with the first significant coefficient (which is the last visited in the backward diagonal scan order 810) is not decoded from the bitstream 133. In other words, if there are N significant coefficients in the current selected sub-block, N−1 sign bits are bypass decoded from the bitstream 133. The sign bit associated with the first significant coefficient is inferred based on the sum of the parities of the significant coefficients. If the sum of the parities is zero, the sign bit associated with the first significant coefficient is inferred as zero. If the sum of the parities is one, the sign bit associated with the first significant coefficient is inferred as one. The value of a quantised coefficient is set to −x[n] if the associated sign bit has a value of one. The value of a quantised coefficient is set to x[n] if the associated sign bit has a value of zero. The method 1400 then terminates.

The arrangements described in methods 900 and 1000 allow for lossless compression of video data to be performed while using the regular residual coding process. Dependent quantisation and sign bit hiding are lossy coding tools which are flexibly disabled when lossless operation is desired, but may still be available for achieving improved coding performance in lossy coding blocks.

INDUSTRIAL APPLICABILITY

The arrangements described are applicable to the computer and data processing industries and particularly for the digital signal processing for the encoding a decoding of signals such as video and image signals, achieving high compression efficiency.

The foregoing describes only some embodiments of the present invention, and modifications and/or changes can be made thereto without departing from the scope and spirit of the invention, the embodiments being illustrative and not restrictive.

The invention claimed is:

1. A method of decoding a transform block from a bitstream, the method comprising:
    decoding a first flag used to determine whether to use dependent quantization in the transform block;
    determining whether to use sign bit hiding in the transform block, wherein, in the sign bit hiding, data indicating a sign of a significant coefficient in a given position of the transform block is not decoded from the bitstream,
    wherein, if the first flag is TRUE, the sign bit hiding shall not be used in the transform block;
    decoding the transform block by using the dependent quantization if it is determined based on the first flag to use the dependent quantization in the transform block; and
    decoding the transform block by using the sign bit hiding if it is determined to use the sign bit hiding in the transform block,
    wherein, in a state where (a) a disabled flag for transform skip residual coding is checked after the first flag is checked and (b) the disabled flag is TRUE, the dependent quantization shall not be used in the transform block, and
    wherein the disable flag indicates whether a first residual coding is applied instead of a second residual coding even if a transform process is skipped, the first residual coding being for a block in which a transform process is not skipped, and the second residual coding being for a block in which a transform process is skipped.

2. The method according to claim 1,
    wherein the first residual coding is for a reverse scan order which starts from a bottom-right position in a sub-block and ends at a top-left position in the sub-block, and
    wherein the second residual coding is for a forward scan order which starts from a top-left position in a sub-block and ends at a bottom-right position in the sub-block.

3. The method according to claim 1,
    wherein, if the sign bit hiding is not used, the same number of signs as a number of significant coefficients in the subblock is decoded.

4. The method according to claim 1,
    wherein, if the sign bit hiding is to be used, at least the enabled flag is TRUE.

5. A method of encoding a transform block into a bitstream, the method comprising:
    encoding a first flag used to determined whether to use dependent quantization in the transform block;

determining whether to use sign bit hiding in the transform block, wherein, in the sign bit hiding, data indicating a sign of a significant coefficient in a given position of the transform block is not encoded, wherein, if the first flag is TRUE, the sign bit hiding shall not be used in the transform block;

encoding the transform block by using the dependent quantization if it is determined based on the first flag to use the dependent quantization in the transform block; and encoding the transform block by using the sign bit hiding if it is determined to use the sign bit hiding in the transform block, wherein, in a state where (a) if a disabled flag for transform skip residual coding is checked after the first flag is checked and (b) the disabled flag is TRUE, the dependent quantization shall not be used in the transform block, and wherein the disabled flag indicates whether a first residual coding is applied instead of a second residual coding even if a transform process is skipped, the first residual coding being for a block in which a transform process is not skipped, and the second residual coding being for a block in which a transform process is skipped.

6. The method according to claim 5,
wherein the first residual coding is for a reverse scan order which starts from a bottom-right position in a sub-block and ends at a top-left position in the sub-block, and wherein the second residual coding is for a forward scan order which starts from a top-left position in a sub-block and ends at a bottom-right position in the sub-block.

7. The method according to claim 5,
wherein, if the sign bit hiding is not used, encoding, for a subblock, a number of signs equal to a number of significant coefficients in the subblock.

8. The method according to claim 5,
wherein, if the sign bit hiding is to be used, at least the enabled flag is TRUE.

9. A decoding apparatus decoding a transform block from a bitstream, comprising:

a processor performing:

decoding a first flag used to determine whether to use dependent quantization in the transform block;

determining whether to use sign bit hiding in the transform block, wherein, in the sign bit hiding, data indicating a sign of a significant coefficient in a given position of the transform block is not decoded from the bitstream, wherein, if the first flag is TRUE, the sign bit hiding shall not be used in the transform block;

decoding the transform block by using the dependent quantization if it is determined based on the first flag to use the dependent quantization in the transform block; and decoding the transform block by using the sign bit hiding if it is determined to use the sign bit hiding in the transform block, wherein, in a state where (a) if a disabled flag for transform skip residual coding is checked after the first flag is checked and (b) the disabled flag is TRUE, the dependent quantization shall not be used in the transform block, and wherein the disabled flag indicates whether a first residual coding is applied instead of a second residual coding even if a transform process is skipped, the first residual coding being for a block in which a transform process is not skipped, and the second residual coding being for a block in which a transform process is skipped.

10. An encoding apparatus encoding a transform block into a bitstream, comprising:

a processor performing:

encoding a first flag used to determined whether to use dependent quantization in the transform block;

determining whether to use_sign bit hiding in the transform block, wherein, in the sign bit hiding, data indicating a sign of a significant coefficient in a given position of the transform block is not encoded, wherein, if the first flag is TRUE, the sign bit hiding shall not be used in the transform block;

encoding the transform block by using the dependent quantization if it is determined based on the first flag to use the dependent quantization in the transform block; and encoding the transform block by using the sign bit hiding if it is determined to use the sign bit hiding in the transform block, wherein, in a state where (a) a disabled flag for transform skip residual coding is checked after the first flag is checked and (b) the disabled flag is TRUE, the dependent quantization shall not be used in the transform block, and wherein the disabled flag indicates whether a first residual coding is applied instead of a second residual coding even if a transform process is skipped, the first residual coding being for a block in which a transform process is not skipped, and the second residual coding being for a block in which a transform process is skipped.

11. A non-transitory computer readable storage medium storing instructions that causes a computer to execute a method of decoding a transform block from a bitstream, the method comprising:

decoding a first flag used to determine whether to use dependent quantization in the transform block;

determining whether to use sign bit hiding in the transform block, wherein, in the sign bit hiding, data indicating a sign of a significant coefficient in a given position of the transform block is not decoded from the bitstream, decoding the transform block by using the sign bit hiding if it is determined to use the sign bit hiding in the transform block, wherein, in a state where (a) if a disabled flag for transform skip residual coding is checked after the first flag is checked and (b) the disabled flag is TRUE, the dependent quantization shall not be used in the transform block, and wherein the disable flag indicates whether a first residual coding is applied instead of a second residual coding even if a transform process is skipped, the first residual coding being for a block in which a transform process is not skipped, and the second residual coding being for a block in which a transform process is skipped.

12. A non-transitory computer readable storage medium storing instructions that causes a computer to execute a method of encoding a transform block into a bitstream, the method comprising:

encoding a first flag used to determine whether to use dependent quantization in the transform block;

determining whether to use sign bit hiding in the transform block, wherein, in the sign bit hiding, data indicating a sign of a significant coefficient in a given position of the transform block is not encoded, wherein if the first flag is TRUE, the sign bit hiding shall not be used in the transform block;

encoding the transform block by using the dependent quantization if it is determined based on the first flag to use the dependent quantization in the transform block; and encoding the transform block by using the sign bit hiding if it is determined to use the sign bit hiding in the transform block, wherein, in a state where (a) a disabled flag for transform skip residual coding is checked after the first flag is checked and (b) the disabled flag is TRUE, the dependent quantization shall not be used in the transform block, and wherein the disabled flag indicates whether a first residual coding is applied instead of a second residual coding even if a transform process is skipped, the first residual coding being for a block in which a transform process is not skipped, and the second residual coding being for a block in which a transform process is skipped.

13. The method according to claim 1, wherein the first flag is not a flag for sequence parameter set.

14. The method according to claim 5, wherein the first flag is not a flag for sequence parameter set.

* * * * *